United States Patent
Yanagiuchi et al.

(10) Patent No.: US 12,344,413 B2
(45) Date of Patent: Jul. 1, 2025

(54) SHEET STORAGE APPARATUS AND SHEET PROCESSING APPARATUS

(71) Applicant: Glory Ltd., Himeji (JP)

(72) Inventors: Hidetomo Yanagiuchi, Hyogo (JP); Yoichi Takemura, Hyogo (JP)

(73) Assignee: GLORY LTD., Himeji (JP)

( * ) Notice: Subject to any disclaimer, the term of this patent is extended or adjusted under 35 U.S.C. 154(b) by 40 days.

(21) Appl. No.: 17/942,176

(22) Filed: Sep. 12, 2022

(65) Prior Publication Data

US 2023/0082666 A1 Mar. 16, 2023

(30) Foreign Application Priority Data

Sep. 16, 2021 (JP) .................. 2021-150969

(51) Int. Cl.
| | |
|---|---|
| B65B 5/04 | (2006.01) |
| B65B 5/10 | (2006.01) |
| B65B 7/06 | (2006.01) |
| B65B 25/14 | (2006.01) |
| B65B 35/50 | (2006.01) |
| B65B 51/14 | (2006.01) |
| B65H 29/46 | (2006.01) |
| B65H 31/26 | (2006.01) |

(52) U.S. Cl.
CPC ............. *B65B 25/14* (2013.01); *B65B 5/106* (2013.01); *B65B 7/06* (2013.01); *B65B 35/50* (2013.01); *B65B 51/146* (2013.01)

(58) Field of Classification Search
CPC ....... B65B 5/045; B65B 25/14; B65B 51/146; B65H 29/46; B65H 31/26

USPC ................................. 53/268, 372.6
See application file for complete search history.

(56) References Cited

U.S. PATENT DOCUMENTS

| | | | | |
|---|---|---|---|---|
| 2,618,814 A | * | 11/1952 | Paton ........................ | B65B 9/24 425/161 |
| 4,872,303 A | * | 10/1989 | Johnson ..................... | B65B 7/06 53/481 |
| 9,117,323 B2 | * | 8/2015 | Brexel ..................... | G07D 11/12 |
| 10,046,873 B2 | * | 8/2018 | Razzaboni .............. | B65B 35/02 |
| 11,267,595 B2 | * | 3/2022 | Wetsch .................... | B32B 27/32 |

(Continued)

FOREIGN PATENT DOCUMENTS

| | | |
|---|---|---|
| DE | 10 2009 053155 A1 | 5/2011 |
| EP | 2979983 A1 | 2/2016 |

(Continued)

OTHER PUBLICATIONS

Extended European Search Report issued Feb. 9, 2023 in corresponding European Patent Application No. 22194780.7, 8 pages.

*Primary Examiner* — Anna K Kinsaul
*Assistant Examiner* — Patrick B Fry
(74) *Attorney, Agent, or Firm* — XSENSUS LLP

(57) ABSTRACT

The present disclosure provides a sheet storage apparatus and a sheet processing apparatus capable of effectively reducing tension applied to the entrance portion of a storage bag that stores sheets at the time of sealing the storage bag. The sheet storage apparatus according to the present disclosure includes a sealing unit that seals a predetermined portion of the storage bag storing sheets and a tension reducing unit that reduces the tension applied to the predetermined portion.

13 Claims, 18 Drawing Sheets

(56) References Cited

U.S. PATENT DOCUMENTS

| | | | |
|---|---|---|---|
| 2009/0113852 A1* | 5/2009 | Cecil | B29C 66/83543 |
| | | | 53/481 |
| 2016/0031574 A1 | 2/2016 | Razzaboni et al. | |
| 2018/0305048 A1 | 10/2018 | Nishimura et al. | |
| 2018/0305049 A1* | 10/2018 | Wetsch | B32B 3/02 |
| 2019/0279453 A1 | 9/2019 | Yokoo et al. | |
| 2020/0353698 A1* | 11/2020 | Shimoda | B29C 65/7894 |

FOREIGN PATENT DOCUMENTS

| | | |
|---|---|---|
| JP | 2016-146142 A | 8/2016 |
| JP | 2020-166425 A | 10/2020 |

* cited by examiner

SHEET STORAGE APPARATUS AND SHEET PROCESSING APPARATUS

CROSS-REFERENCE TO RELATED APPLICATION

This application claims priority to Japanese Patent Application No. 2021-150969, filed on Sep. 16, 2021, the disclosure of which is incorporated herein by reference in its entirety.

TECHNICAL FIELD

The present disclosure relates to a sheet storage apparatus for storing sheets and a sheet processing apparatus comprising a sheet storage apparatus.

BACKGROUND ART

Sheet storage apparatuses that store sheets, such as securities or banknotes, in a storage bag have been in widespread use. For example, PTL 1 describes an apparatus that feeds sheets into a storage bag and stores the sheets in a stacked manner. In addition, to store more sheets in a storage bag, PTL 2 describes an apparatus that feeds sheets into a storage bag and, thereafter, compresses the sheets by using a piston.

CITATION LIST

Patent Literature

PTL 1

Japanese Patent Application Laid-Open No. 2016-146142

PTL 2

European Patent No. 2979983

SUMMARY

A sheet storage apparatus of the present disclosure comprises: a sealing unit that seals a predetermined portion of a storage bag that stores sheets; and a tension reducing unit that reduces tension applied to the predetermined portion.

DESCRIPTION OF EMBODIMENTS

Figure 1:
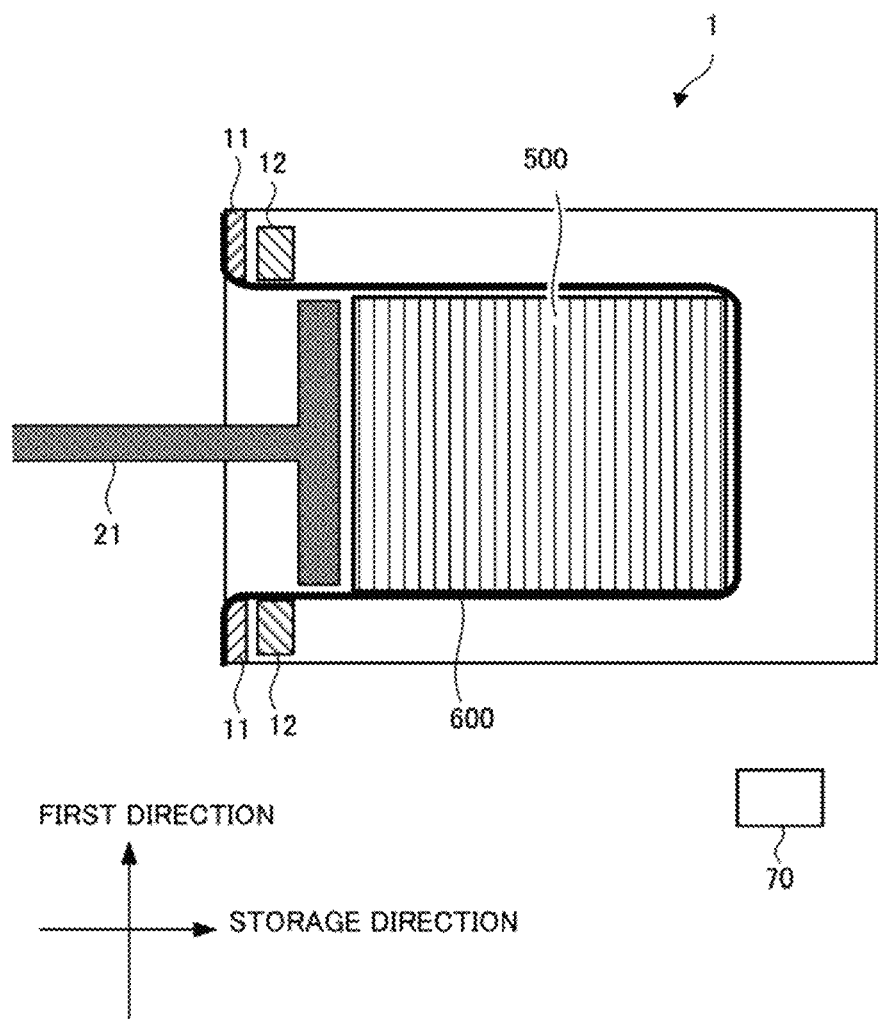
FIG. 1 illustrates the configuration of a sheet storage apparatus according to Embodiment 1 of the present disclosure.

After the sheets have been stored in a storage bag, the entrance of the storage bag needs to be sealed. When pressure is applied to the sheets to compress the sheets, the inner surface of the storage bag is pulled by the sheets and tension is applied to the entrance portion of the storage bag. The sealed portion is weak in strength. Thus, if the storage bag is sealed with a large tension applied, the storage bag may tear from the sealed portion.

According to the technique described in PTL 2, after the sheets are compressed and before the entrance portion of the storage bag is completely closed, the entrance portion is almost closed beforehand by using a sealing member. Then, the bottom portion of the storage bag is raised, and the entrance portion is closed. In this manner, the tension applied to the entrance portion is reduced.

However, according to the technique described in PTL 2, the entrance portion is closed beforehand by pulling the storage bag using the sealing member. Therefore, when the entrance portion is closed beforehand, a large force is applied to the sealing member. As a result, the sealing member may be broken, or the sealing member attaching direction may be deviated. As a result, it may be difficult to accurately seal the storage bag using a sealing member.

The present disclosure provides a sheet storage apparatus and a sheet processing apparatus capable of effectively reducing the tension applied to an entrance portion when a storage bag for storing sheets is sealed.

A sheet storage apparatus of the present disclosure comprises: a sealing unit that seals a predetermined portion of a storage bag that stores sheets; and a tension reducing unit that reduces tension applied to the predetermined portion.

In the sheet storage apparatus of the present disclosure, the tension reducing unit may comprise a closing unit that sandwiches the storage bag from an outside thereof and closes the storage bag at a position that is closer to an inner side than the predetermined portion in the storage direction, and wherein the closing unit may move between a first position at which the closing unit closes the storage bag and a second position at which a degree of closure of the storage bag is less than that at the first position.

In the sheet storage apparatus of the present disclosure, the sealing unit may move to a sealing position at which the storage bag is sealed, along with an operation performed by the closing unit to close the storage bag.

In the sheet storage apparatus of the present disclosure, the closing unit may comprise a first closing unit and a second closing unit that are disposed with the storage bag therebetween in a first direction perpendicular to the storage direction and that move while facing each other, and wherein a distance between the first closing unit and the second closing unit at the second position may be greater than a distance between the first closing unit and the second closing unit at the first position.

In the sheet storage apparatus of the present disclosure, the first closing unit and the second closing unit may be members that extend parallel to each other in a second direction perpendicular to the storage direction and the first direction, and wherein a length of the first closing unit and the second closing unit may be less than a length of the storage bag in the second direction.

In the sheet storage apparatus of the present disclosure, the tension reducing unit may adjust a distance between the first closing unit and the second closing unit at the second position in accordance with an amount of the sheets stored in the storage bag.

In the sheet storage apparatus of the present disclosure, the tension reducing unit may comprise a pull unit that pulls at least part of the storage bag toward an outer side in the storage direction, and wherein the pull unit may be disposed so as to be closer to an inner side than the sealing unit in the storage direction.

In the sheet storage apparatus of the present disclosure, a plurality of the pull units may be disposed symmetrically about the storage direction, and wherein when the plurality of pull units pulls the storage bag, positions of the plurality of pull units in the storage direction may be the same.

In the sheet storage apparatus of the present disclosure, the pull unit may be formed in a protrusion shape having a circular cross section.

In the sheet storage apparatus of the present disclosure, the tension reducing unit may adjust an amount of the storage bag to be pulled by the pull unit in accordance with an amount of the sheets stored in the storage bag.

In the sheet storage apparatus of the present disclosure, the storage bag may be attached so that the storage direction of the sheets is horizontal, and the sheets may be pushed into the storage bag in a standing position.

The sheet storage apparatus of the present disclosure may further comprise: an attachment portion to which the storage bag is to be attached.

A sheet processing apparatus of the present disclosure comprises: a receiving unit that receives sheets; and the sheet storage apparatus described above that stores the sheets that have been received.

In the sheet storage apparatus of the present disclosure, a portion of the contact portion that comes into contact with the storing bag is formed with a shape without a corner.

According to the present disclosure, it is possible to effectively reduce the tension applied to the entrance portion when the storage bag for storing sheets is sealed.

Embodiments of the present disclosure are described in detail below with reference to the accompanying drawings. Note that a too detailed description, such as detailed description of widely known matters and duplicate description for substantially the same configuration, may not be given. In addition, the same reference numerals are used throughout the embodiments for elements having the same configuration, and the description is not necessarily repeated.

Embodiment 1

FIG. 1 illustrates the configuration of a sheet storage apparatus according to Embodiment 1 of the present disclosure. As illustrated in FIG. 1, the sheet storage apparatus 1 comprises a pair of attachment portions 11, a compression unit 21, a pair of sealing units 12, and a tension reducing unit 70.

The attachment portion 11 allows a storage bag 600 to be attached and fixed thereto for storing sheets 500. The sheet storage apparatus 1 comprises a pair of attachment portions 11. In the following description, the direction from one of the pair of attachment portions 11 to the other is referred to as a "first direction". In addition, the direction in which the sheets 500 move when they are stored in the storage bag 600, that is, the direction from the entrance to the inside of the storage bag 600 is referred to as a "storage direction". The first direction and the storage direction are mutually perpendicular. FIG. 1 is a cross-sectional view of the sheet storage apparatus 1 in a plane including a first direction and a storage direction perpendicular to the first direction.

The storage bag 600 is a bag made of, for example, resin, non-woven fabric, paper, or the like and has an entrance on one side. Examples of the material of the storage bag 600 include resin, non-woven fabric, and paper, but a material suitable for the intended use may be used as appropriate.

The entrance portion of the storage bag 600 is attached to the attachment portion 11. The main body portion other than the entrance portion of the storage bag 600 is disposed so as to extend from the entrance portion, which is attached to the attachment portion 11, in the storage direction. Note that the sheets 500 are sheets having a predetermined size, such as banknotes or securities.

The compression unit 21 pushes the sheets 500 from the outside into inside of the storage bag 600. The sheets 500 are pushed by the compression unit 21 with the front surface and the back surface being perpendicular to the storage direction. In addition, the compression unit 21 applies a compressive force to the sheets stored inside the storage bag 600 in the storage direction. As a result, the sheets 500 are stored in the storage bag 600 so as to be stacked on one another.

The sealing units 12 sandwich and seal a predetermined portion of the storage bag 600 from the outside. To seal the storage bag 600 using the sealing units 12, a widely used technique can be employed. For example, if at least the inner surface of the entrance portion of the storage bag 600 is made of resin or the like, the sealing units 12 seal the storage bag 600 by applying heat to the predetermined portion and welding the storage bag 600. Alternatively, the sealing units 12 may seal the storage bag 600 by applying pressure to the entrance portion of the storage bag 600 and pressure bonding the storage bag 600. Still alternatively, the sealing units 12 may seal the storage bag 600 by using an instrument such as a stapler.

The predetermined portion of the storage bag 600 sealed by the sealing unit 12 is a portion located closer to the inner side in the storage direction than the entrance portion of the storage bag 600, which is attached to the attachment portions 11, and closer to the outer side than the sheets 500 stored inside the storage bag 600 in the storage direction. The position of the predetermined portion where the sealing unit 12 seals the storage bag 600 may be predetermined or may be appropriately changed in accordance with, for example, the number of sheets 500 stored inside the storage bag 600.

The tension reducing unit 70 reduces the tension applied to the predetermined portion of the storage bag 600 sealed by the sealing unit 12. The tension reducing unit 70 has a configuration independent of the sealing unit 12.

Since the compression unit 21 applies a compressive force to the sheets 500 inside the storage bag 600, a large tension is applied to the storage bag 600 due to friction at the contact points between the sheets 500 and the inner surface of the storage bag 600. When the sealing unit 12 performs a process, such as applying of heat when sealing the predetermined portion, the strength of the predetermined portion may be temporarily decreased. If the strength of the predetermined portion is decreased due to the sealing process while tension is applied to the storage bag 600, the storage bag 600 may be torn at the predetermined portion.

The tension reducing unit 70 reduces the tension applied to at least the predetermined portion from completion of storing the sheets 500 in the storage bag 600 until the sealing unit 12 seals the predetermined portion. Thus, the occurrence of damage to the storage bag 600 is prevented when the storage bag 600 is sealed.

How the tension reducing unit 70 specifically reduces the tension applied to the predetermined portion is described in detail with reference to the embodiments below.

As described above, according to the sheet storage apparatus 1 of Embodiment 1, the tension reducing unit 70 reduces the tension applied to at least the predetermined portion during the period from completion of storing the sheets 500 in the storage bag 600 until the sealing unit 12 seals the predetermined portion. Thus, the occurrence of damage to the predetermined portion of the storage bag 600 can be prevented when the storage bag 600 is sealed.

Furthermore, the tension reducing unit 70 has a configuration provided independently of the sealing unit 12. As a result, when the tension reducing unit 70 reduces the tension applied to the predetermined portion, disadvantage such as a large force applied to the sealing unit 12 can be prevented.

Embodiment 2

According to Embodiment 2, an embodiment is described in which the tension reducing unit 70 has a pair of closing units 71 that close the storage bag 600 before the sealing unit 12 seals the storage bag 600.

Note that in the following description, the storage bag 600 is attached sideways to the sheet storage apparatus 1. The term "sideways" means that the entrance of the storage bag 600 faces in a direction perpendicular to the up-down direction. That is, the storage bag 600 is attached to the sheet storage apparatus 1 such that the sheet 500 is stored in the storage bag 600 in the horizontal direction.

As used herein, the term "up-down direction" refers to the up-down direction of the sheet storage apparatus 1 installed on a horizontal plane. That is, the up-down direction is an example of a first direction according to the present disclosure. In addition, as used herein, the term "right-left direction" refers to the right-left direction when the sheet storage apparatus 1 installed on the horizontal plane is viewed from the outer side in the storage direction. That is, the right-left direction is an example of a second direction according to the present disclosure.

Furthermore, in the following description, the inner side in the storage direction is the side close to the bottom (the innermost part) of the storage bag 600 in the storage direction, and the outer side in the storage direction is the side away from the bottom of the storage bag 600 in the storage direction.

According to Embodiment 2, the sheets 500 are stacked in a standing position and is stored in the storage bag 600 attached sideways. The standing position of the sheets 500 means that the front surface and the back surface of the sheet 500 face in a direction perpendicular to the up-down direction.

Figure 2:
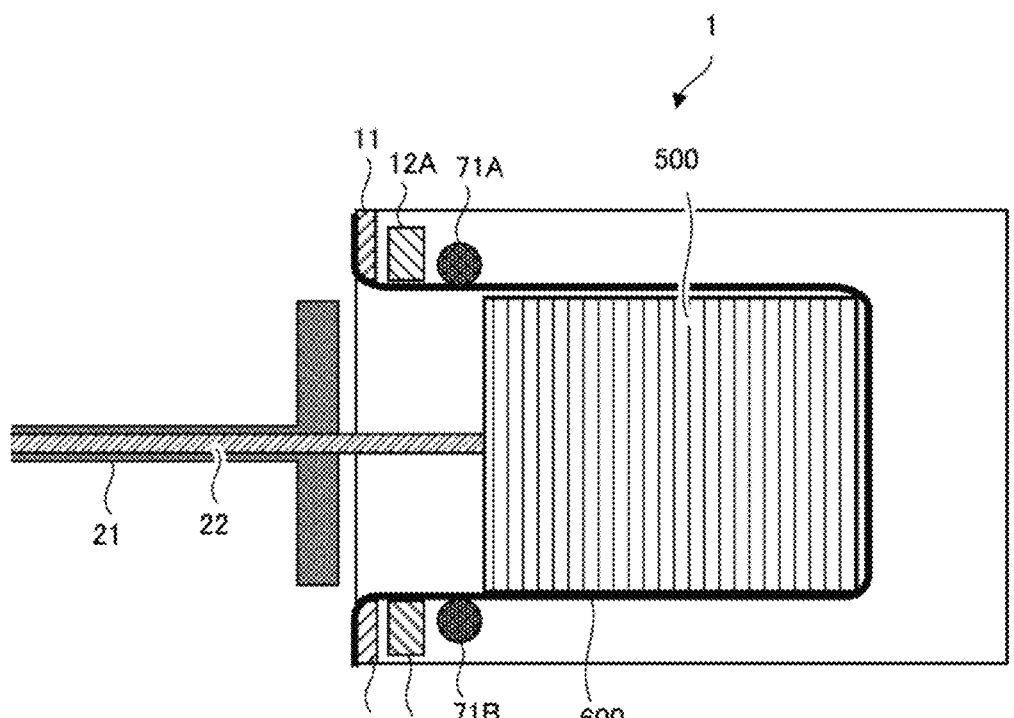
FIG. 2 illustrates the configuration of a sheet storage apparatus according to Embodiment 2.
Figure 2:
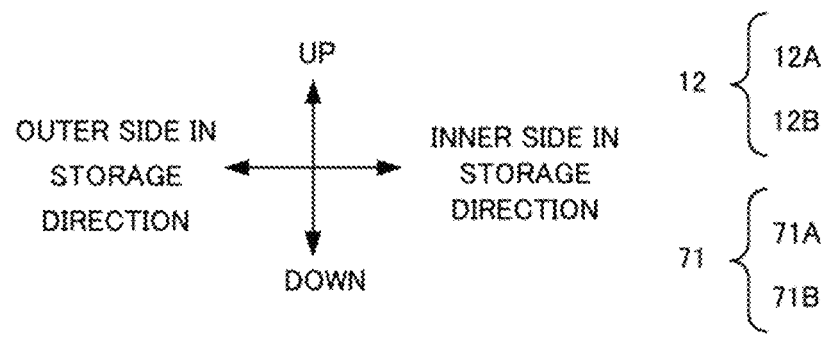

FIG. 2 illustrates the configuration of the sheet storage apparatus 1 according to Embodiment 2. As illustrated in FIG. 2, the pair of closing units 71 is provided so as to be closer to the inner side than the sealing unit 12 in the storage direction. The two closing units 71 are disposed with the storage bag 600 therebetween in the up-down direction perpendicular to the storage direction.

The closing units 71 sandwich the storage bag 600 from the outside to close the storage bag 600 before the storage bag 600 is sealed by the sealing unit 12. At this time, the two closing units 71 disposed with the storage bag 600 therebetween move so as to face each other. The portion of the storage bag 600 closed by the closing unit 71 is located so as to be closer to the inner side than the predetermined portion sealed by the sealing unit 12 in the storage direction and be closer to the outer side than the outermost sheet 500 stored inside the storage bag 600 in the storage direction. Note that the operations performed by the closing unit 71 and the sealing unit 12 are controlled by the control unit 50 (described below).

The two closing units 71 are a first closing unit 71A disposed above the storage bag 600 and a second closing unit 71B disposed below the storage bag 600. To reduce the tension applied to the predetermined portion of the storage bag 600, the first closing unit 71A and the second closing unit 71B move closer to each other in the up-down direction, so that the closing unit 71 closes the entrance of the storage bag 600.

In addition, as illustrated in FIG. 2, the sealing units 12 are a first sealing unit 12A disposed above the storage bag 600 and a second sealing unit 12B disposed below the storage bag 600. When the sealing unit 12 seals the entrance of the storage bag 600, the first sealing unit 12A and the second sealing unit 12B moves closer to each other in the up-down direction.

A holding unit 22 is provided at the center of the compression unit 21 in the up-down direction so as to hold the sheets 500 inside the storage bag 600 in a compressed manner. The holding unit 22 is configured to be movable in the storage direction independently of the compression unit 21. In the example illustrated in FIG. 2, the compression unit 21 is retracted from the inside of the storage bag 600, but the top end portion of the holding unit 22 positioned on the inner side in the storage direction holds the compressed sheets 500 inside the storage bag 600. The holding unit 22 is, for example, a plate-shaped or rod-shaped member, and the compression unit 21 has a gap or a hole at the center thereof in the up-down direction. The gap or hole allows the holding unit 22 to pass therethrough.

The operation performed by the sheet storage apparatus 1 according to Embodiment 2 is described below.

Figure 3:
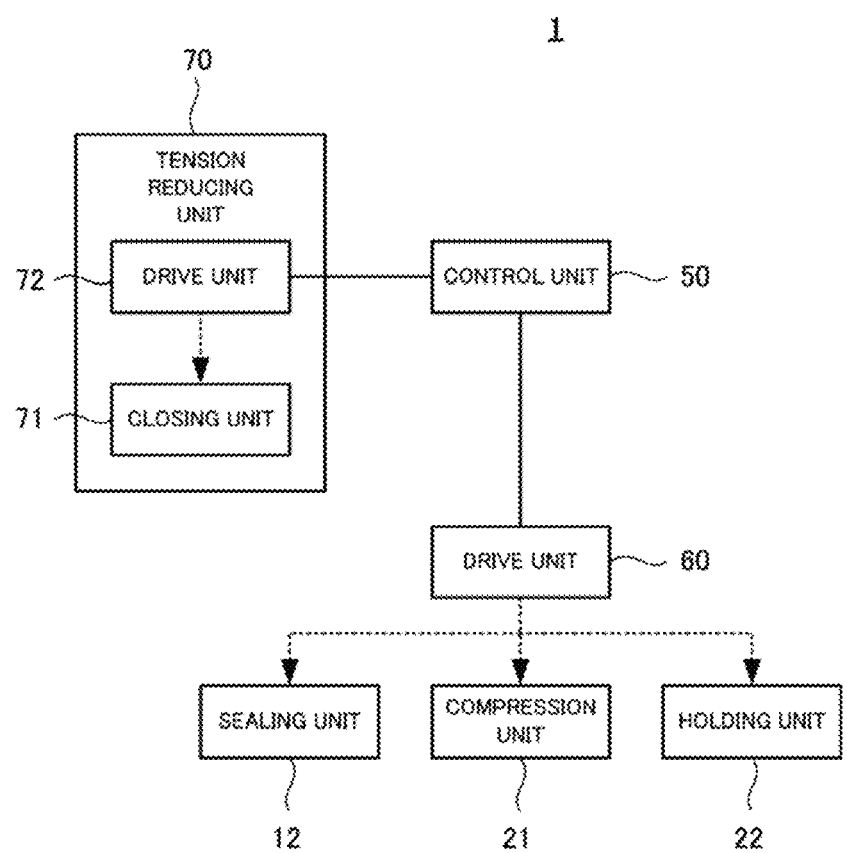
FIG. 3 is a functional block diagram of the sheet storage apparatus according to Embodiment 2.

FIG. 3 is a functional block diagram of the sheet storage apparatus 1 according to Embodiment 2. In FIG. 3, the configurations connected by a solid line are electrically connected to each other. Furthermore, in FIG. 3, a broken line arrow indicates how the driving force is supplied.

As illustrated in FIG. 3, the sheet storage apparatus 1 comprises a control unit 50, a drive unit 60, and a tension reducing unit 70. The control unit 50 controls the drive unit 60 and the tension reducing unit 70. The control unit 50 is a processor, such as central processing unit (CPU).

The drive unit 60 supplies a driving force to at least one of the sealing unit 12, the compression unit 21, and the holding unit 22 under the control of the control unit 50. The drive unit 60 is, for example, an electric motor. In the example illustrated in FIG. 3, one drive unit 60 supplies the driving force to the sealing unit 12, the compression unit 21, and the holding unit 22. However, a drive unit may be provided for each of the sealing unit 12, the compression unit 21, and the holding unit 22.

The tension reducing unit 70 comprises a closing unit 71 and a drive unit 72. The drive unit 72 of the tension reducing unit 70 supplies a driving force to the closing unit 71 under the control of the control unit 50. Note that although in FIG. 3, the drive unit 60 and the drive unit 72 of the tension reducing unit 70 are illustrated as separate configurations, the drive unit 60 and the drive unit 72 may be integrated into one body.

FIGS. 4 to 11 illustrate the operation performed by the sheet storage apparatus 1 at the time of storage, according to Embodiment 2. Like FIG. 2, FIGS. 4 to 11 are cross-sectional views of the sheet storage apparatus 1 in a plane including the up-down direction and the storage direction perpendicular to the up-down direction.

Figure 4:
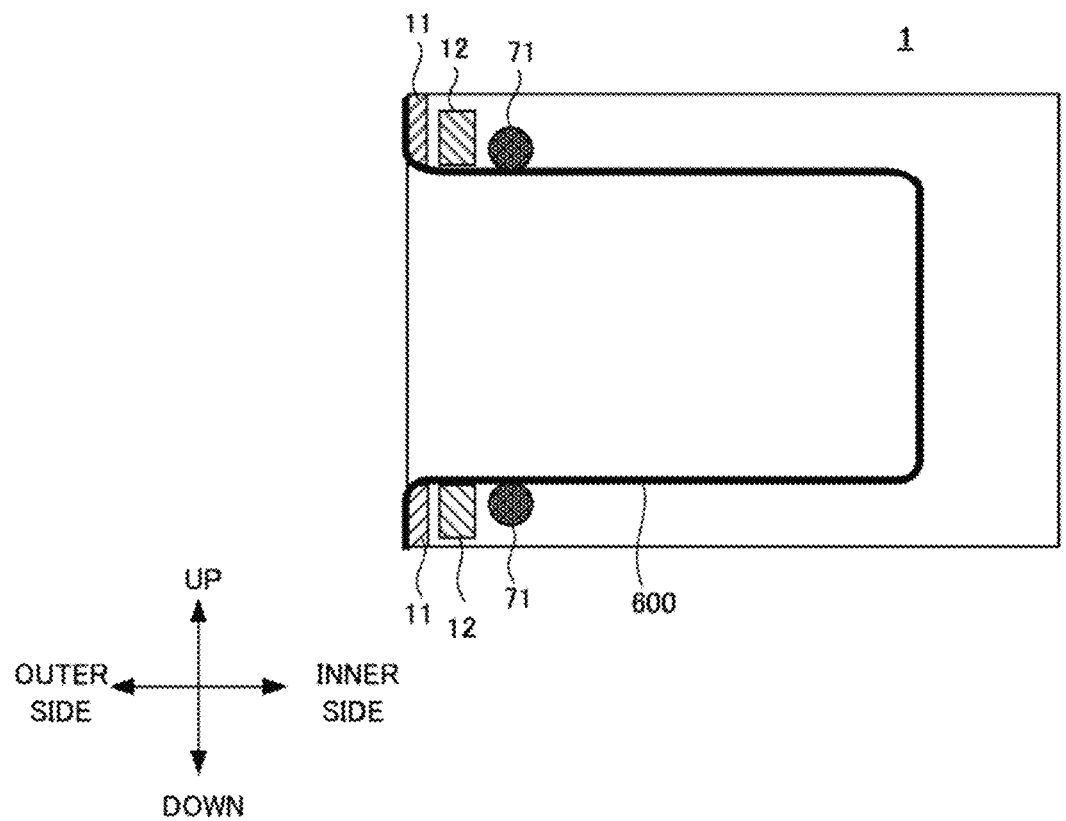
FIG. 4 illustrates the operation performed by the sheet storage apparatus at the time of storage according to Embodiment 2.

FIG. 4 illustrates the upper and lower attachment portions 11 to which the upper and lower entrance portions of the storage bag 600 that is open in the up-down direction are attached.

Figure 5:
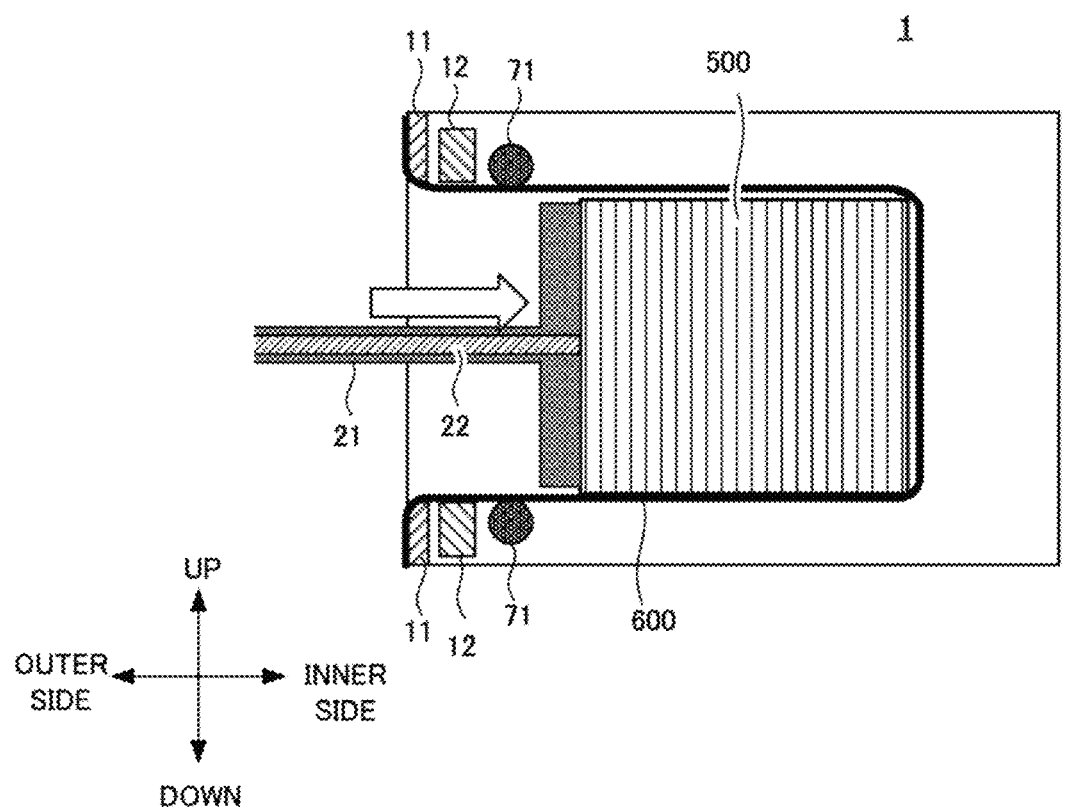
FIG. 5 illustrates the operation performed by the sheet storage apparatus at the time of storage according to Embodiment 2.

At this time, as illustrated in FIG. 5, the compression unit 21 and the holding unit 22 operate due to the driving force supplied by the drive unit 60 under the control of the control unit 50 and, thus, push the sheets 500 from the outer side in the storage direction to the inside of the storage bag 600. When the innermost sheet 500 in the storage direction reaches the innermost part of the storage bag 600, the compression unit 21 applies a compressive force to the stack of sheets 500 inside the storage bag 600. As a result, the sheets 500 are compressed inside the storage bag 600.

Figure 6:
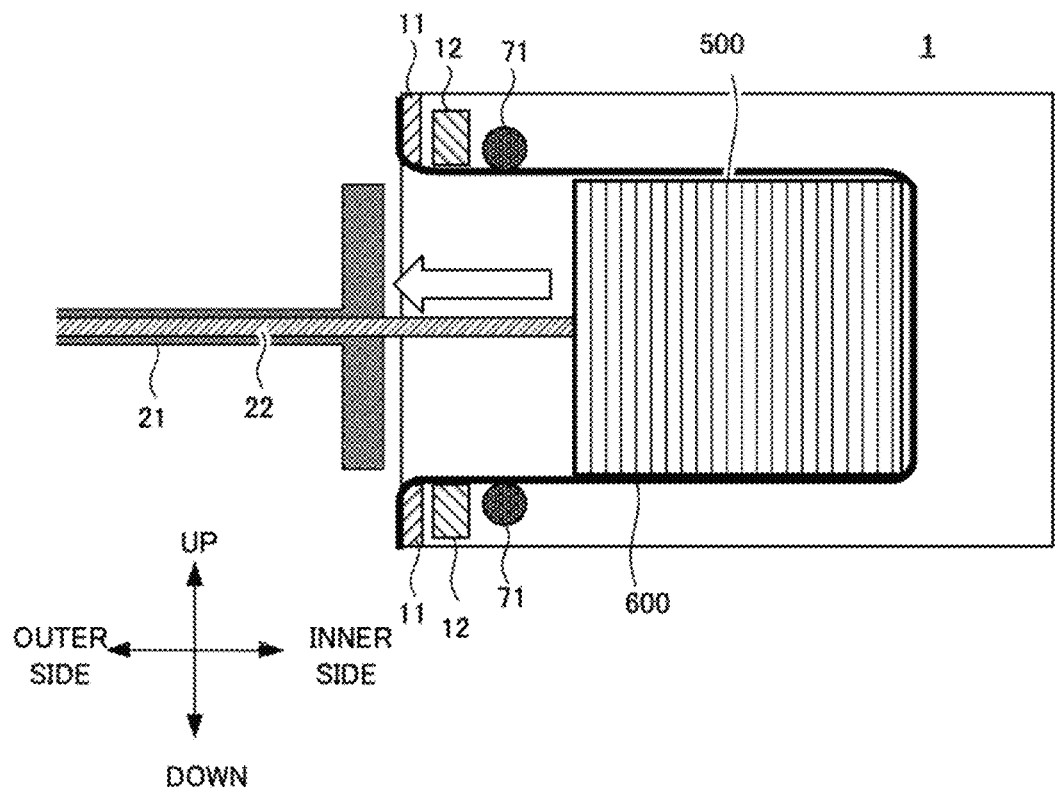
FIG. 6 illustrates the operation performed by the sheet storage apparatus at the time of storage according to Embodiment 2.

Subsequently, as illustrated in FIG. 6, the compression unit 21 retracts to the outer side in the storage direction. At this time, the holding unit 22 does not retract and holds the sheets 500 in a compressed manner.

Figure 7:
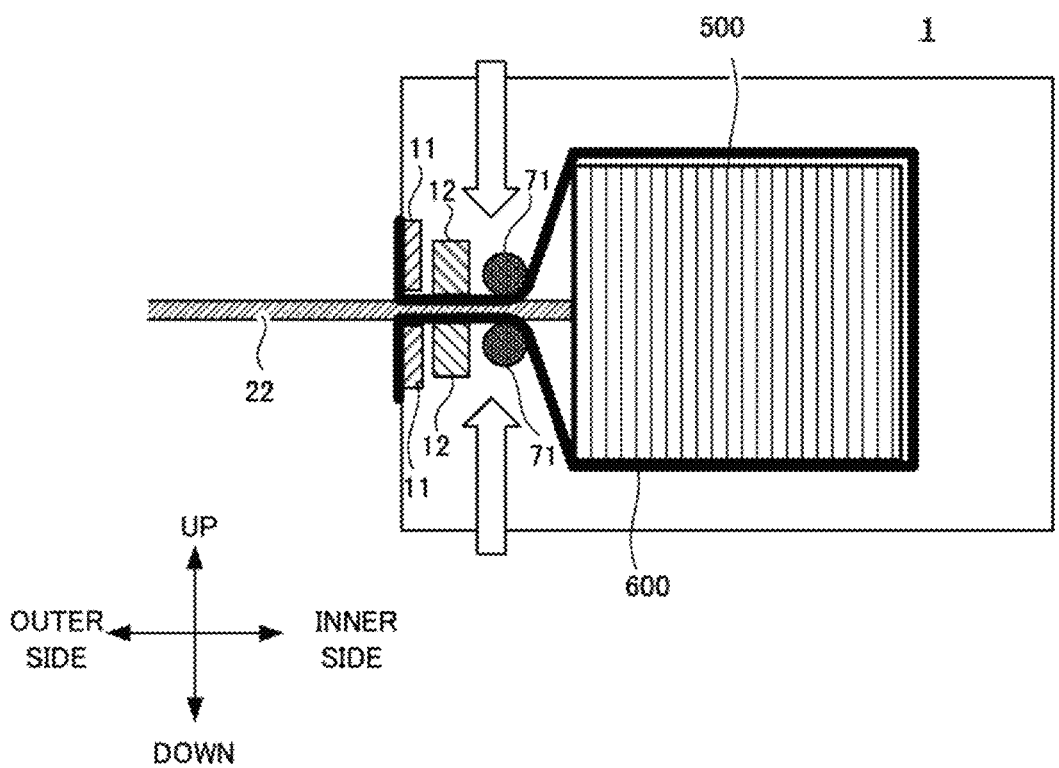
FIG. 7 illustrates the operation performed by the sheet storage apparatus at the time of storage according to Embodiment 2.

Subsequently, as illustrated in FIG. 7, the two closing units 71 sandwich the storage bag 600 of the sheets 500 from above and below due to the driving force supplied by the drive unit 72 under the control of the control unit 50 so as to close the entrance portion of the storage bag 600. At this time, along with the operation performed by the two closing units 71 to close the storage bag 600, the two sealing units 12 also move to the sealing position where the storage bag 600 is to be sealed by sandwiching the storage bag 600 from above and below. Note that the operation performed by the closing units 71 to close the storage bag 600 and the operation performed by the sealing units 12 to move to the sealing position may be performed separately. However, if the operation to move to the sealing position is performed by the sealing units 12 along with the operation performed by the closing units 71 to close the storage bag 600, the time required for the operation performed by the sheet storage apparatus 1 to store sheets can be reduced.

Through the above-described operation, the entrance portion of the storage bag 600 is closed to some extent while the top end portion of the holding unit 22 holds the sheets 500 inside the storage bag 600. At this stage, the first closing unit 71A and the second closing unit 71B are separated from each other by a distance almost the same as the thickness of the holding unit 22 in the up-down direction.

Figure 8:
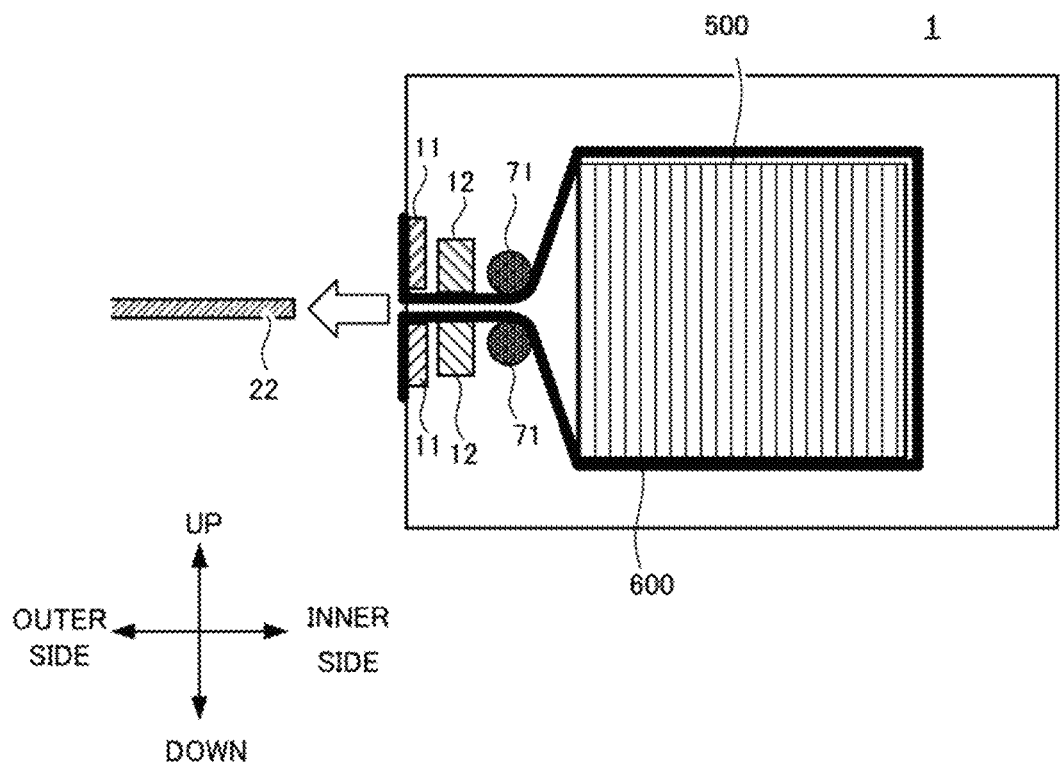
FIG. 8 illustrates the operation performed by the sheet storage apparatus at the time of storage according to Embodiment 2.
Figure 9:
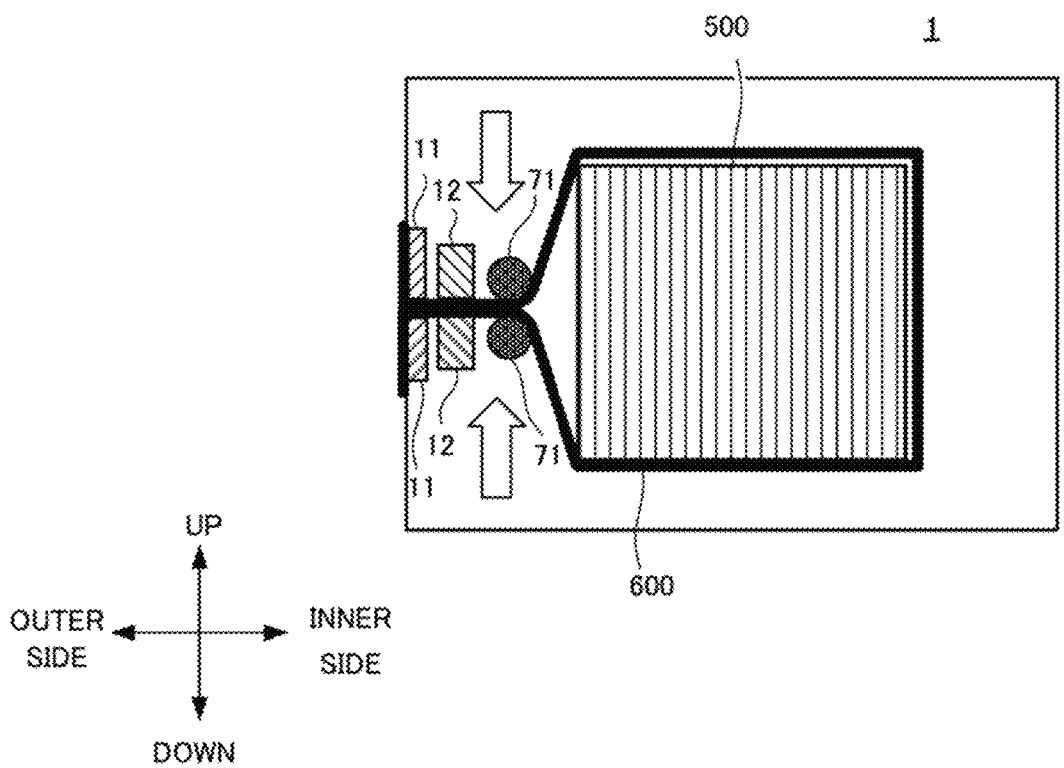
FIG. 9 illustrates the operation performed by the sheet storage apparatus at the time of storage according to Embodiment 2.

Subsequently, as illustrated in FIG. 8, the holding unit 22 retracts to the outer side in the storage direction. At almost the same time, as illustrated in FIG. 9, the closing units 71 move to a first position and closes the storage bag 600. The first position is a position at which the two closing units 71 are brought into contact with each other via the storage bag 600. Even if the holding unit 22 is retracted, the sheets 500 are held by the inner surface of the storage bag 600, with which the sheets 500 are brought into contact when the closing units 71 close the storage bag 600. Thus, even after the holding unit 22 is retracted, the sheets 500 remain compressed.

Figure 10:
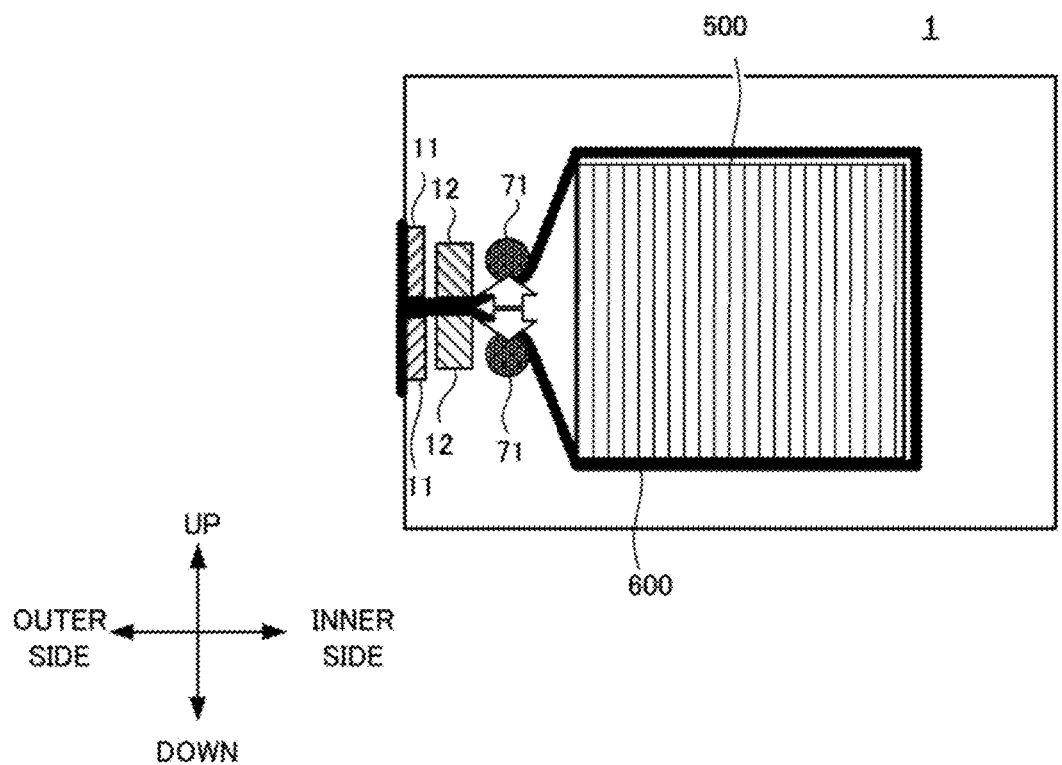
FIG. 10 illustrates the operation performed by the sheet storage apparatus at the time of storage according to Embodiment 2.

Subsequently, as illustrated in FIG. 10, the closing units 71 move to a second position at which the degree of closure of the storage bag 600 is less than that at the first position. The second position is a position at which the distance between the first closing unit 71A and the second closing unit 71B is greater than that at the first position. As a result, the tension applied to the storage bag 600 at the predetermined portion in contact with the sealing units 12 is reduced while the sheets 500 remain compressed.

Note that the distance between the first closing unit 71A and the second closing unit 71B at the second position may be adjustable as appropriate in accordance with, for example, the amount (the number) of the sheets 500 stored in the storage bag 600. More specifically, when the control unit 50 controls the drive unit 60 to move the closing units 71, the control unit 50 can relatively increase the distance if the number of sheets 500 stored in the storage bag 600 is relatively large and can relatively decrease the distance if the number of sheets 500 is relatively small. Through such control, the control unit 50 can control how much tension applied to the storage bag 600 is reduced at the predetermined portion to be sealed by the sealing units 12.

Figure 11:
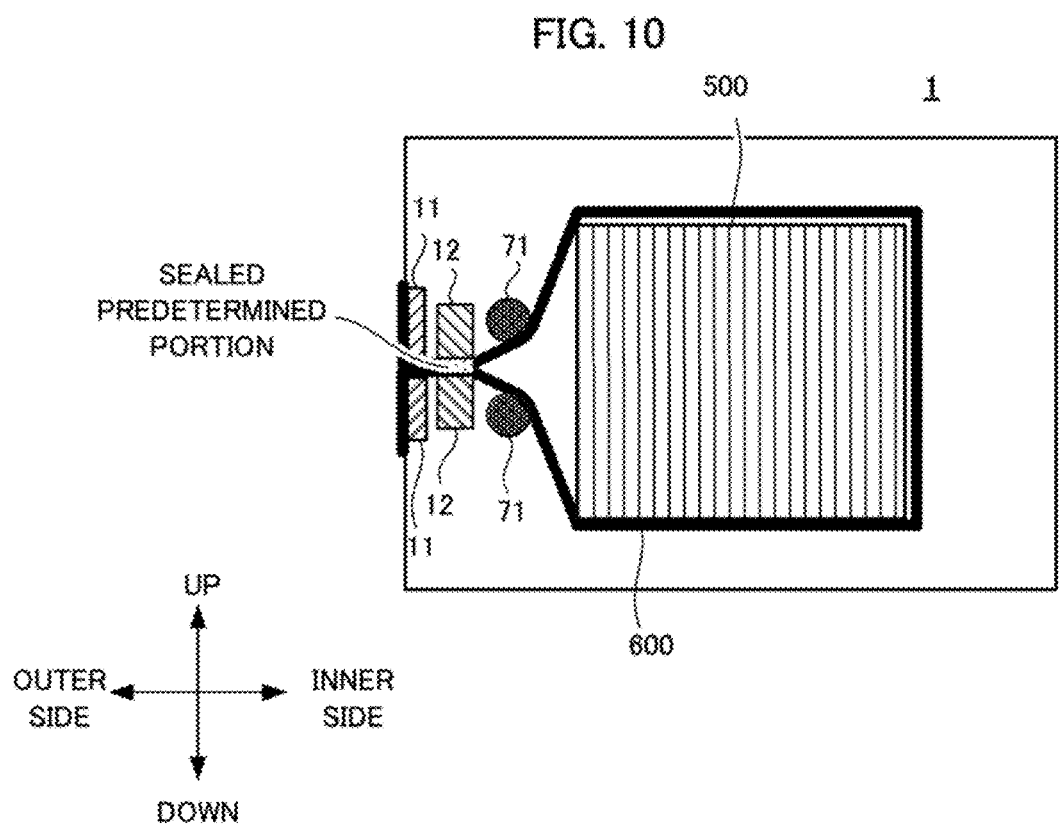
FIG. 11 illustrates the operation performed by the sheet storage apparatus at the time of storage according to Embodiment 2.

Subsequently, as illustrated in FIG. 11, the sealing units 12 seal the storage bag 600 at the predetermined portion. In this manner, the operation performed by the sheet storage apparatus 1 at the time of storage is completed.

As described above, in the storage operation performed by the sheet storage apparatus 1, the closing units 71 move to the first position at which the degree of closure is relatively large as illustrated in FIG. 9 and then, the storage bag 600 is temporarily closed. Thereafter, as illustrated in FIG. 10, the closing units 71 move to the second position at which the degree of closure is relatively small. That is, the closing units 71 close the storage bag 600 temporarily in FIG. 9 and, then, slightly opens the storage bag 600 in FIG. 10. Such an operation can reduce the tension applied to the predetermined portion of the storage bag 600 in contact with the sealing units 12.

The tension applied to the storage bag 600 is discussed below with reference to each of the storage operations performed by the sheet storage apparatus 1. As illustrated in FIG. 9, when the two closing units 71 move to the first position and close the storage bag 600, each of the closing units 71 is brought into contact with the storage bag 600 and moves in a direction closer to each other. As a result, tension generated by the closing units 71 that move closer to each other is applied to a portion of the storage bag 600 that is in contact with the closing units 71.

Thereafter, as illustrated in FIG. 10, when the two closing units 71 move to the second position, each of the closing units 71 moves in a direction away from each other. As a result, the degree of closure of the storage bag 600 closed by the closing units 71 is less than that when the closing units 71 are at the first position. As a result, the tension applied to the storage bag 600 at the portion in contact with the closing unit 71 is less than that when the closing units 71 are at the first position.

As illustrated in, for example, FIG. 9, when the closing units 71 sandwich the storage bag 600 and close the storage bag 600, the sealing units 12 also move closer to each other along with the operation performed by the closing units 71 and move to the sealing position. As viewed from the storage bag 600, the closing unit 71 and the sealing unit 12 move in the same direction at almost the same time, so that no tension is generated between the portion of the storage bag 600 in contact with the closing unit 71 and the predetermined portion in contact with the sealing unit 12. Therefore, through the above-described operation performed by the closing unit 71, the tension applied to the storage bag 600 at the predetermined portion sealed by the sealing unit 12 can be reduced.

That is, the closing units 71 move to the first position and close the storage bag 600, so that the extra length of the predetermined portion of the storage bag 600 in contact with the sealing unit 12 is temporarily reduced. Thereafter, the closing units 71 move to the second position. Thus, the extra length of the predetermined portion of the storage bag 600 is obtained again.

As a result, when the sealing unit 12 performs the sealing operation on the predetermined portion of the storage bag 600, the tension applied to the predetermined portion of the storage bag 600 is relatively low, so that even if the strength of the predetermined portion is reduced by the sealing operation, the occurrence of damage to the predetermined portion of the storage bag 600 can be prevented.

Figure 12:
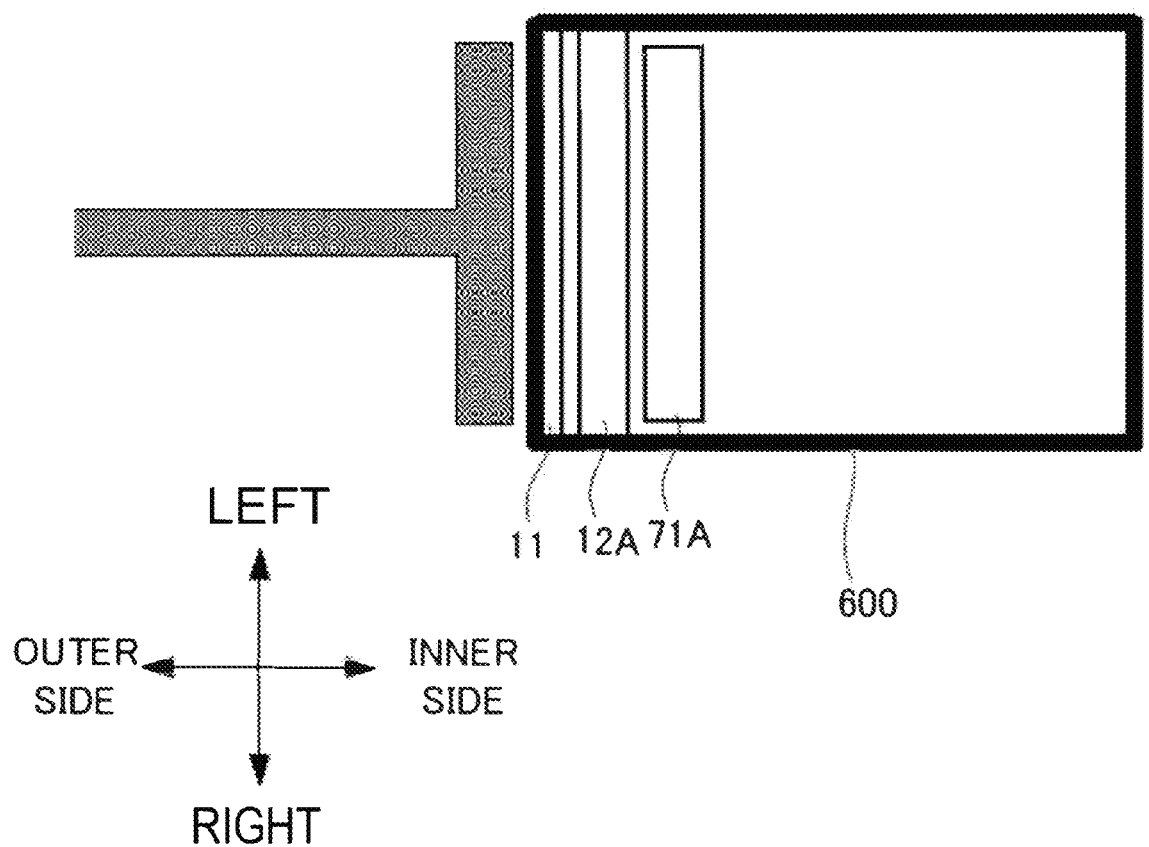
FIG. 12 is a top view of the sheet storage apparatus with a storage bag attached thereto.

FIG. 12 is a top view of the sheet storage apparatus 1 with the storage bag 600 attached. As illustrated in FIG. 12, the attachment portion 11, the first sealing unit 12A, and the first closing unit 71A are members extending in the right-left direction. Although not illustrated in FIG. 12, the second sealing unit 12B and the second closing unit 71B disposed below are also disposed parallel to the first sealing unit 12A and the first closing unit 71A, respectively, and are members extending in the right-left direction.

The length of the closing units 71 in the right-left direction is less than or equal to the length (width) of the storage bag 600 in the right-left direction. As a result, the width of the entire sheet storage apparatus 1 can be set to a value almost the same as the width of the storage bag 600 and, thus, the size of the sheet storage apparatus 1 can be relatively reduced. However, if the length of the closing unit 71 in the right-left direction is too less than the width of the storage bag 600, the closing unit 71 cannot close the storage bag 600 tightly. Therefore, the width of the closing unit 71 needs to be set to a value slightly less than the width of the storage bag 600.

Embodiment 3

According to Embodiment 3, the configuration is described in which the tension reducing unit 70 comprises a pull unit 73 instead of the closing unit 71 described in Embodiment 2. The pull unit 73 pulls part of the storage bag 600 toward outer side in the storage direction.

Like Embodiment 2, according to Embodiment 3, the storage bag 600 is attached sideways to the sheet storage apparatus 1. Then, the sheets 500 are stacked in a standing position and is stored in the storage bag 600 attached sideways.

Figure 13A:
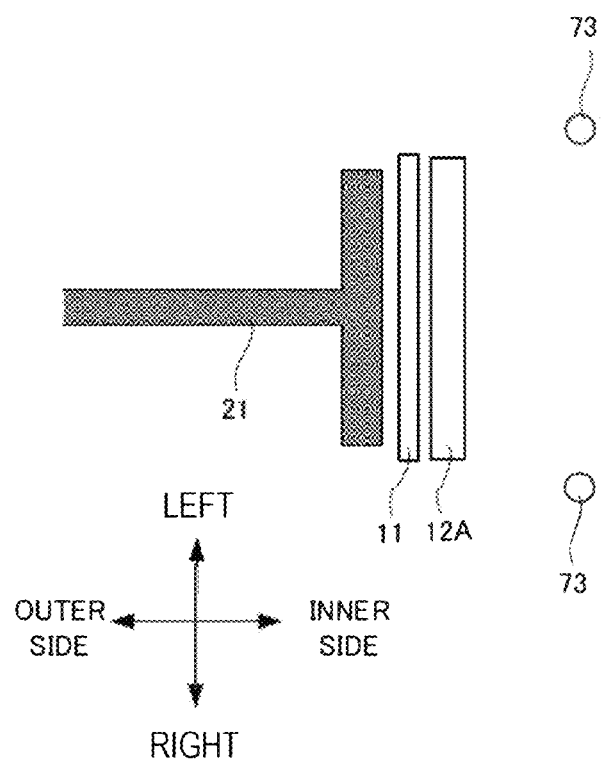
FIG. 13A illustrates the configuration of a sheet storage apparatus according to Embodiment 3.
Figure 13B:
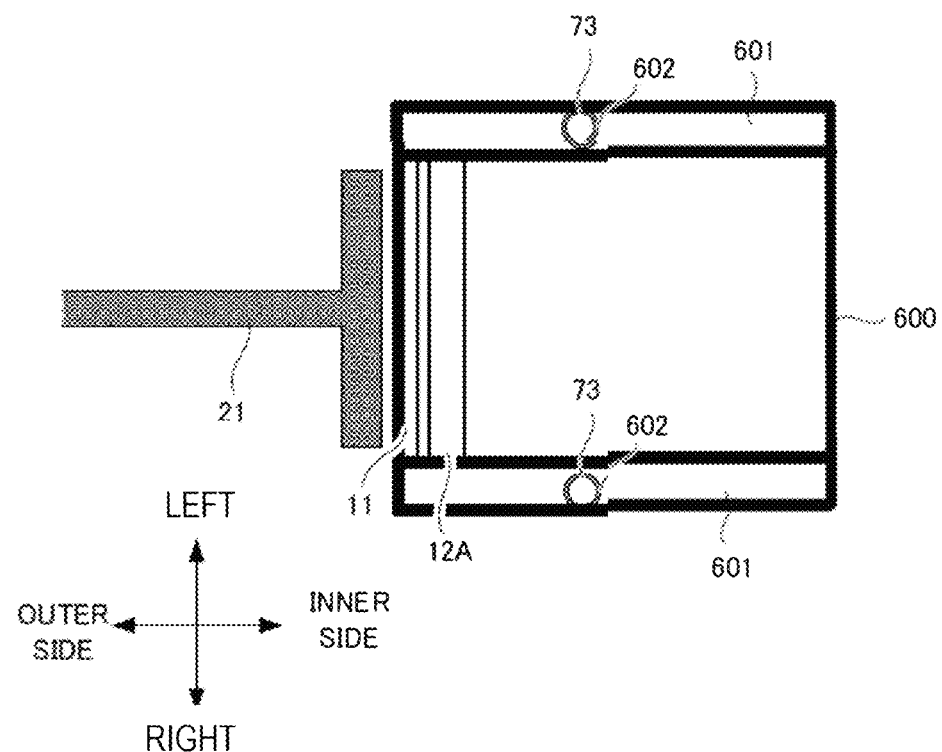
FIG. 13B illustrates the configuration of the sheet storage apparatus according to Embodiment 3.

FIGS. 13A and 13B illustrate the configuration of a sheet storage apparatus 1 according to Embodiment 3. FIGS. 13A and 13B are top views of the sheet storage apparatus 1. FIG. 13A illustrates the configuration before the storage bag 600 is attached to the sheet storage apparatus 1, and FIG. 13B illustrates the configuration after the storage bag 600 is attached to the sheet storage apparatus 1.

As illustrated in FIG. 13A, the sheet storage apparatus 1 comprises the attachment portion 11, the sealing unit 12, a compression unit 21, and the pull unit 73. Although not illustrated, a holding unit 22 is provided at the center portion of the compression unit 21 in the up-down direction, like Embodiment 2.

The pull unit 73 is provided so as to be closer to the inner side than the sealing unit 12 in the storage direction and be movable in the storage direction. The pull unit 73 is fitted into a hole portion 602 (described below) of the storage bag 600. As a result, the storage bag 600 can be pulled in the movement direction in which the pull unit 73 moves. The pull unit 73 is configured to be movable on, for example, a rail provided to extend in the storage direction.

As illustrated in FIG. 13A, the two pull units 73 are provided so as to be symmetrical about the storage direction. In the example illustrated in FIG. 13A, two pull units 73 are provided. However, more pull units 73 may be provided as long as they are symmetrical about the storage direction. The positions of the two pull units 73 in the storage direction are the same at all times even when the pull units 73 move. In this manner, the two pull units 73 can pull the storage bag 600 equally on the left and right sides.

The pull unit 73 is formed in a protrusion shape having a circular cross section, such as a pin shape. As a result, the pull unit 73 is fitted into the hole portion 602 of the storage bag 600, and when the storage bag 600 is pulled, the load applied to the hole portion 602 can be reduced to a low level.

According to Embodiment 3, as illustrated in FIG. 13B, a bag skirt 601 is provided at both left and right ends of the storage bag 600. The storage bag 600 consists of bonding an upper sheet material and a lower sheet material at positions slightly inwardly away from the bottom edge and the left and right edges. As a result, there is a remainder of the sheet material on the outside of the bonded portion where the upper and lower sheet materials are bonded at the right and left edge portions of the storage bag 600. The bag skirt 601 is a portion representing the remainder of the sheet material outside the bonded portion. That is, the bag skirt 601 is a portion of the storage bag 600 independent of the space for storing the sheets 500 inside the storage bag 600 and is a flat member protruding from the bonded portion.

Note that while the above example has been described with reference to the storage bag 600 formed by bonding two sheet materials, the storage bag may be formed using another technique. For example, the storage bag may be formed by closing the bottom of a cylindrical shape formed by bonding both ends of one sheet material together. Alternatively, the storage bag may be formed by folding one sheet material at the center portion in the longitudinal direction and bonding both ends thereof.

The bag skirt 601 comprises the hole portion 602 into which the pull unit 73 is fitted. The storage bag 600 is pulled by the pull unit 73 fitted in the hole portion 602 when the pull unit 73 moves in the storage direction.

The storage bag 600 comprises two bag skirts 601 provided symmetrically about the storage direction. Each of the two bag skirts 601 comprises the hole portion 602. In the storage bag 600 attached to the attachment portion 11, the locations of the two hole portions 602 in the storage direction are the same.

The operation performed by the sheet storage apparatus 1 according to Embodiment 3 is described below.

Figure 14:
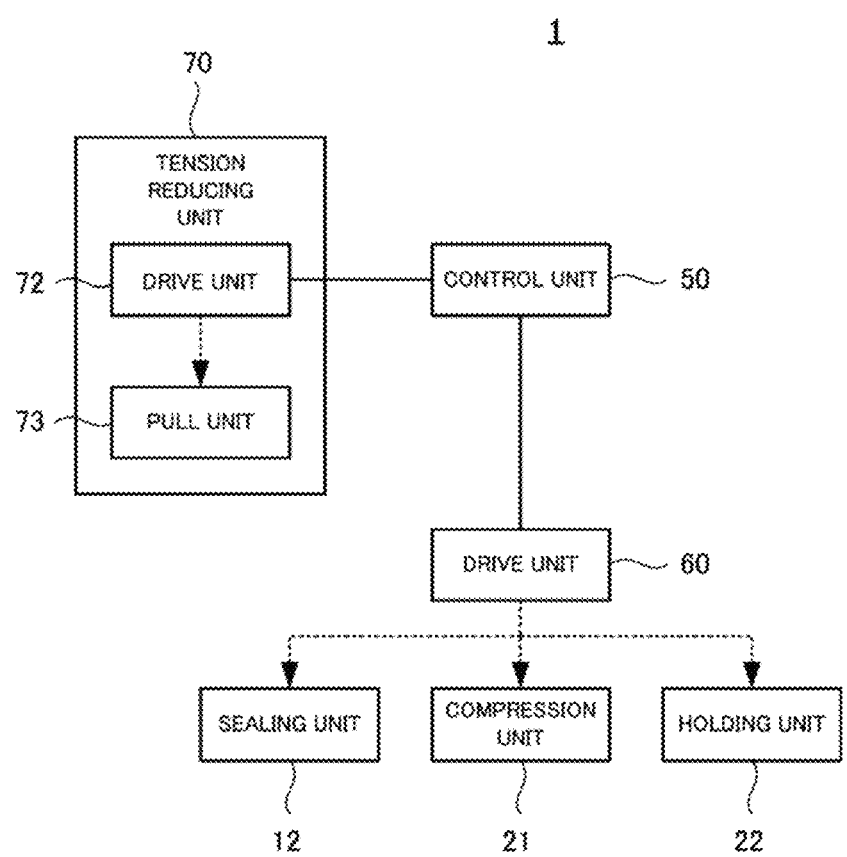
FIG. 14 is a functional block diagram of the sheet storage apparatus according to Embodiment 3.

FIG. 14 is a functional block diagram of the sheet storage apparatus 1 according to Embodiment 3. In FIG. 14, the configurations connected by a solid line are electrically connected to each other. In addition, in FIG. 14, a broken line arrow indicates how the driving force is supplied.

As illustrated in FIG. 14, the tension reducing unit 70 comprises the drive unit 72 and the pull unit 73. The drive unit 72 of the tension reducing unit 70 supplies a driving force to the pull unit 73 under the control of the control unit 50. Although in FIG. 14, the drive unit 60 and the drive unit 72 of the tension reducing unit 70 are illustrated as separate configurations, the drive unit 60 and the drive unit 72 may be integrated into one body.

FIGS. 15 to 18 illustrate the operation performed by the sheet storage apparatus 1 according to Embodiment 3 at the time of sealing. Like FIG. 13A, FIGS. 15 to 18 are top views of the sheet storage apparatus 1.

Figure 15:
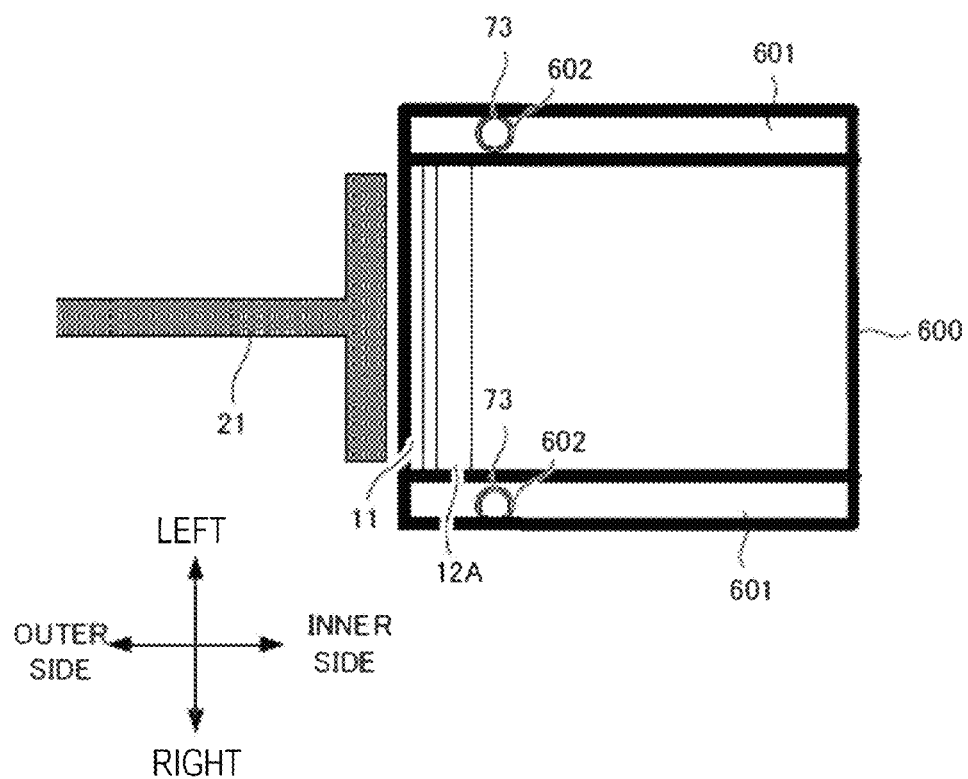
FIG. 15 illustrates the operation performed by the sheet storage apparatus at the time of sealing according to Embodiment 3.

FIG. 15 illustrates the attachment portion 11 having the entrance portion of the storage bag 600 attached thereto and the pull unit 73 fitted into the hole portion 602.

Figure 16:
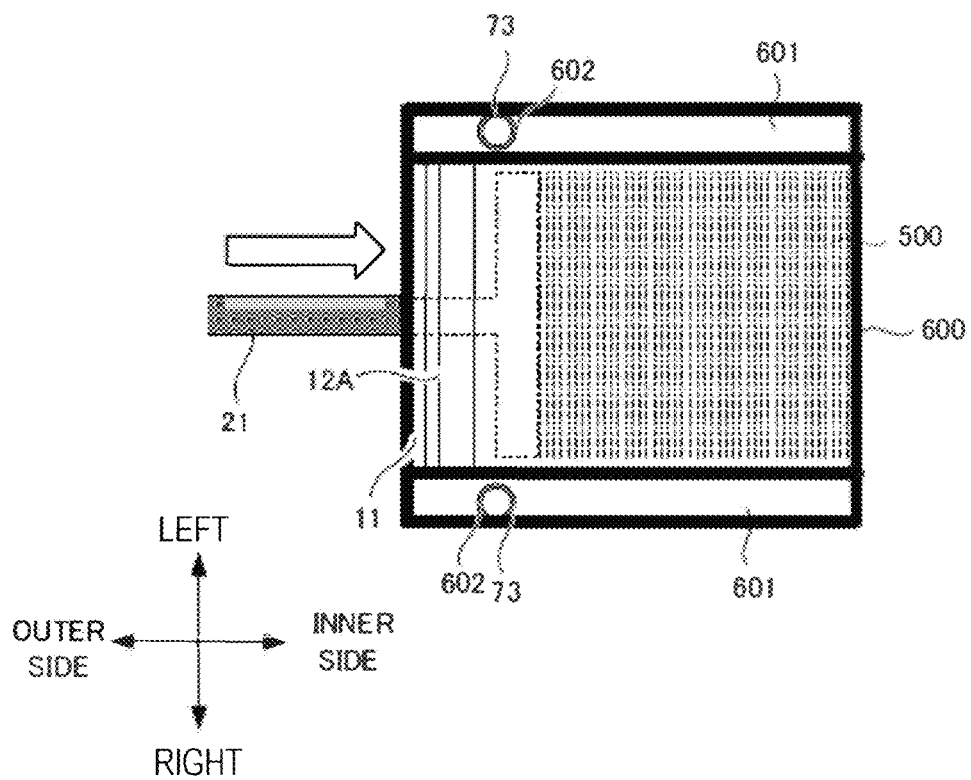
FIG. 16 illustrates the operation performed by the sheet storage apparatus at the time of sealing according to Embodiment 3.

At this time, as illustrated in FIG. 16, the compression unit 21 and the holding unit 22 operate due to the driving force supplied from the drive unit 60 under the control of the control unit 50 and push the sheets 500 from the outer side in the storage direction to the inner side of the storage bag 600. In FIG. 16, the inside of the storage bag 600 is illustrated by a broken line. When the innermost one of the sheets 500 in the storage direction reaches the innermost part of the storage bag 600, the compression unit 21 applies a compressive force to the sheets 500 inside the storage bag 600. As a result, the sheets 500 are compressed inside the storage bag 600.

When the sheets 500 are stored in the storage bag 600, the pull unit 73 moves so that its position is in front of the outermost one of the sheets 500 stored in the storage bag 600 in the storage direction.

Figure 17:
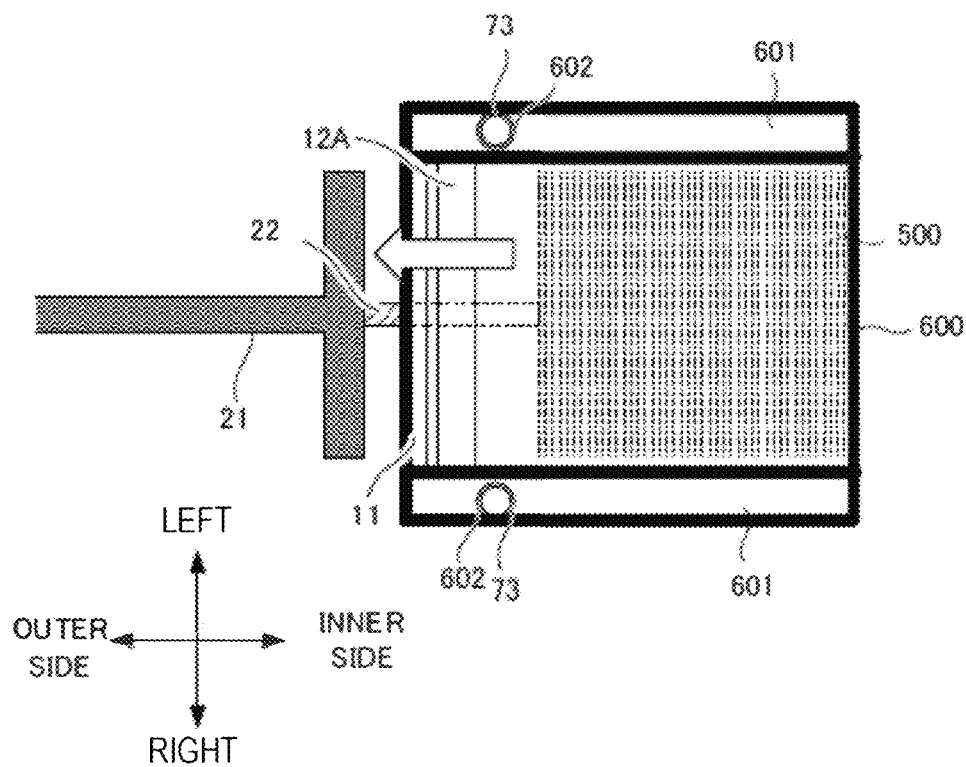
FIG. 17 illustrates the operation performed by the sheet storage apparatus at the time of sealing according to Embodiment 3.

Subsequently, as illustrated in FIG. 17, the compression unit 21 retracts to the outer side in the storage direction. At this time, the holding unit 22 does not retract and holds the sheets 500 in a compressed manner.

Figure 18:
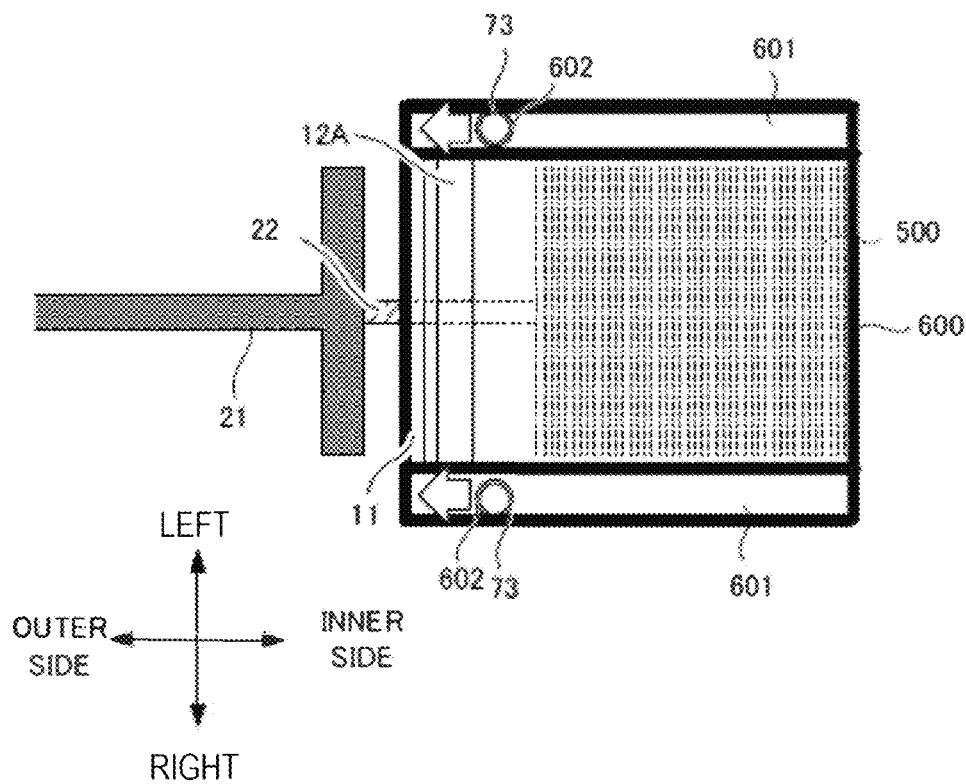
FIG. 18 illustrates the operation performed by the sheet storage apparatus at the time of sealing according to Embodiment 3.

Then, as illustrated in FIG. 18, the two pull units 73 move to the outer side by a predetermined distance in the storage direction. As a result, a portion around the hole portion 602 of the storage bag 600 is also pulled by the pull unit 73 and moves the predetermined distance toward the outer side in the storage direction. Since the pull unit 73 has moved to a position on an outer side of the outermost one of the sheets 500 in the storage direction in FIG. 16, this operation generates an extra length between the predetermined portion of the storage bag 600 that is brought into contact with the sealing unit 12 and the portion in contact with the outermost sheet 500.

The predetermined distance is a distance set in order to reduce the tension applied to the predetermined portion at which the sealing unit 12 seals the storage bag 600. For example, the control unit 50 can set a predetermined distance on the basis of the amount of sheets 500 stored in the storage bag 600. For example, when the control unit 50 controls the drive unit 60 to move the pull unit 73, the predetermined distance can be relatively increased if the number of sheets 500 stored in the storage bag 600 is relatively large. In contrast, the predetermined distance can be relatively decreased if the number of sheets 500 is relatively small. Through such control, the control unit 50 can control how much tension applied to the storage bag 600 is reduced at the predetermined portion to be sealed by the sealing units 12.

Note that if the moving distance of the pull unit 73 is too large, the extra length of the storage bag 600 in the predetermined portion is excessively increased and thus, the storage bag 600 bends or wrinkles, although the tension applied to the predetermined portion can be reduced. To avoid the issue, for example, data on an optimum predetermined distance can be obtained in accordance with the amount of sheets 500 in advance through an experiment or the like and can be stored in a storage unit (not illustrated), and the control unit 50 can refer to the data and set the predetermined distance.

Then, after the holding unit 22 retracts to the outer side in the storage direction and, thereafter, the sealing unit 12 sandwiches the storage bag 600 from above and below, the sealing unit 12 seals the predetermined portion of the storage bag 600.

As described above, according to the sheet storage apparatus 1 of Embodiment 3, the pull unit 73 moves a predetermined distance to the outer side in the storage direction and pulls the peripheral portion of the hole portion 602 of the storage bag 600 toward the outer side in the storage direction. In this manner, an extra length is generated in a portion of the storage bag 600 that is closer to the outer side than the hole portion 602 in the storage direction. Since the predetermined portion in which the sealing unit 12 seals the storage bag 600 is closer to the outer side than the hole portion 602 in the storage direction, an extra length is also generated in the predetermined portion. As a result, the occurrence of damage to the predetermined portion of the storage bag 600 can be prevented at the time of sealing.

Furthermore, according to the sheet storage apparatus 1 of Embodiment 3, a pull unit 73 that pulls the storage bag 600 is provided separately from the attachment portion 11 to which the storage bag 600 is attached. Since the attachment portion 11 does not move even if the pull unit 73 moves, an extra length can be reliably generated between the portion of the storage bag 600 in contact with the attachment portion 11 and the portion in contact with the pull unit 73 by the pull unit 73 moving toward the outer side in the storage direction.

Embodiment 4

According to Embodiment 4, a sheet processing apparatus 100 comprising the sheet storage apparatus 1 according to each of the above-described embodiments is described.

The sheet processing apparatus 100 is an apparatus that performs various processing, such as deposit processing or withdrawal processing of sheets (banknotes). In the following description, the side on which a receiving unit 103 (described below) of the sheet processing apparatus 100 is disposed is referred to as a "front side", and the opposite side is referred to as a "rear side". In addition, a horizontal direction perpendicular to the front-rear direction is referred to as a "right-left direction".

Figure 19:
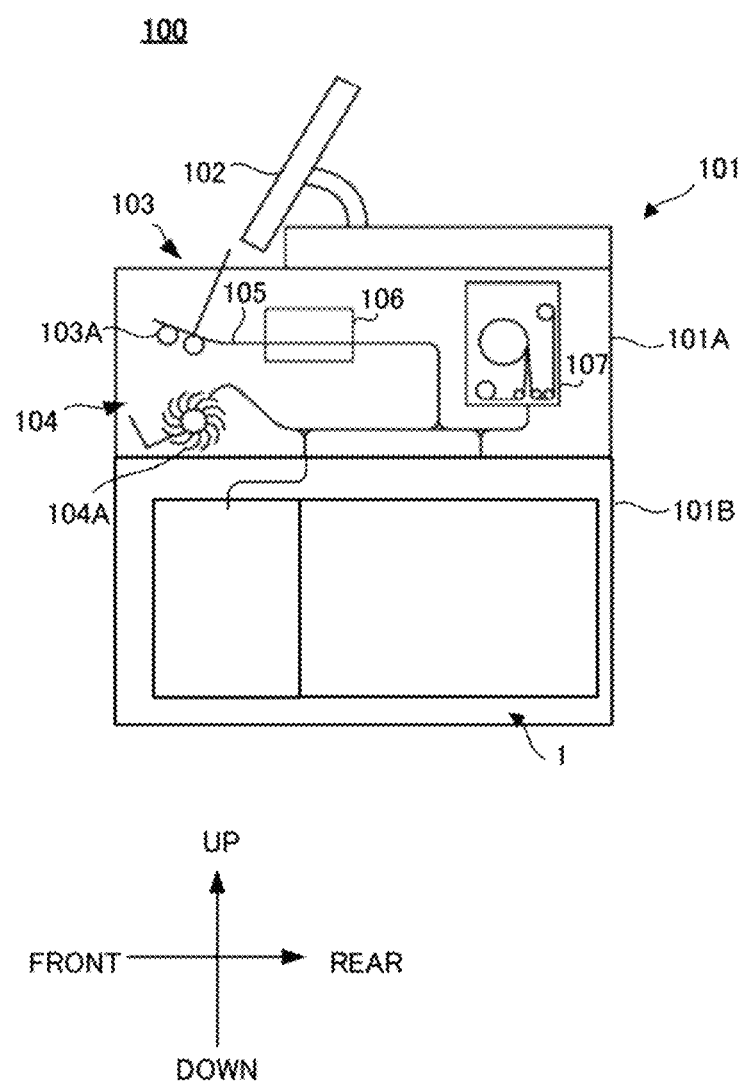
FIG. 19 illustrates the configuration of a sheet storage apparatus according to Embodiment 4.

FIG. 19 illustrates the configuration of the sheet processing apparatus 100 according to Embodiment 4. As illustrated in FIG. 19, the sheet processing apparatus 100 comprises a housing 101 having a substantially rectangular cuboid shape. An upper unit 101A and a lower unit 101B are housed inside the housing 101.

The upper unit 101A comprises an operation unit 102, the receiving unit 103, an outlet section 104, a transport unit 105, a recognition unit 106, and a storage and feeding unit 107.

An operation unit 102 is provided on the upper part of the housing 101. The operation unit 102 receives an operation performed by a user of the sheet processing apparatus 100. The sheet processing apparatus 100 performs various processes in accordance with the operation performed on the operation unit 102 by the user. The operation unit 102 may be a touch panel on top of a display, such as a liquid crystal display. In this case, the display displays a screen that allows the user to select a process to be performed by the sheet processing apparatus 100 or the amount of the sheets 500 (for example, the number of sheets or total amount of money) stored in the sheet processing apparatus 100.

The receiving unit 103 is provided in an upper front part of the housing 101. The receiving unit 103 comprises, for example, a receiving hopper for taking in banknotes from the outside to inside of the housing 101. Furthermore, the outlet section 104 for dispensing banknotes from the inside to outside of the housing 101 is provided below the receiving unit 103.

The receiving unit 103 takes in a group of one or more sheets set by the user. The receiving unit 103 comprises a feeding mechanism 103A for feeding, into the housing 101, the sheets constituting the sheet group one by one. The sheets that have been fed out one by one from the feeding mechanism 103A are transported by the transport unit 105 one by one.

The recognition unit 106 is provided in a transport path constituting the transport unit 105. The recognition unit 106 recognizes the denomination, authenticity, face/back, fitness, old/new, transport status, and the like of the sheet transported by the transport unit 105.

Furthermore, the storage and feeding unit 107 (a temporary storage unit) is provided downstream of the recognition unit 106 in the transport unit 105. The storage and feeding unit 107 temporarily stores the sheets transported from the transport unit 105 and feeds, to the transport unit 105, the stored sheets one by one. As a result, the sheets stored in the storage and feeding unit 107 can be transported from the storage and feeding unit 107 to the sheet storage apparatus 1 provided in the lower unit 101B. Note that the storage and feeding unit 107 is composed of, for example, a feeding apparatus of a tape reel type.

The outlet section 104 is connected to the transport unit 105. At the time of withdrawal processing performed by the sheet processing apparatus 100, a required amount of sheets is temporarily accumulated in the outlet section 104 by the transport unit 105. The outlet section 104 is accessible from the outside of the housing 101, and the user can take out the sheets accumulated in the outlet section 104 from the front of the housing 101.

A stacking wheel 104A is provided at a connection point of the transport unit 105 to the outlet section 104. Due to the rotation of the stacking wheel 104A, the sheet sandwiched between the vanes of the stacking wheel 104A is accumulated in the outlet section 104.

Figure 20:
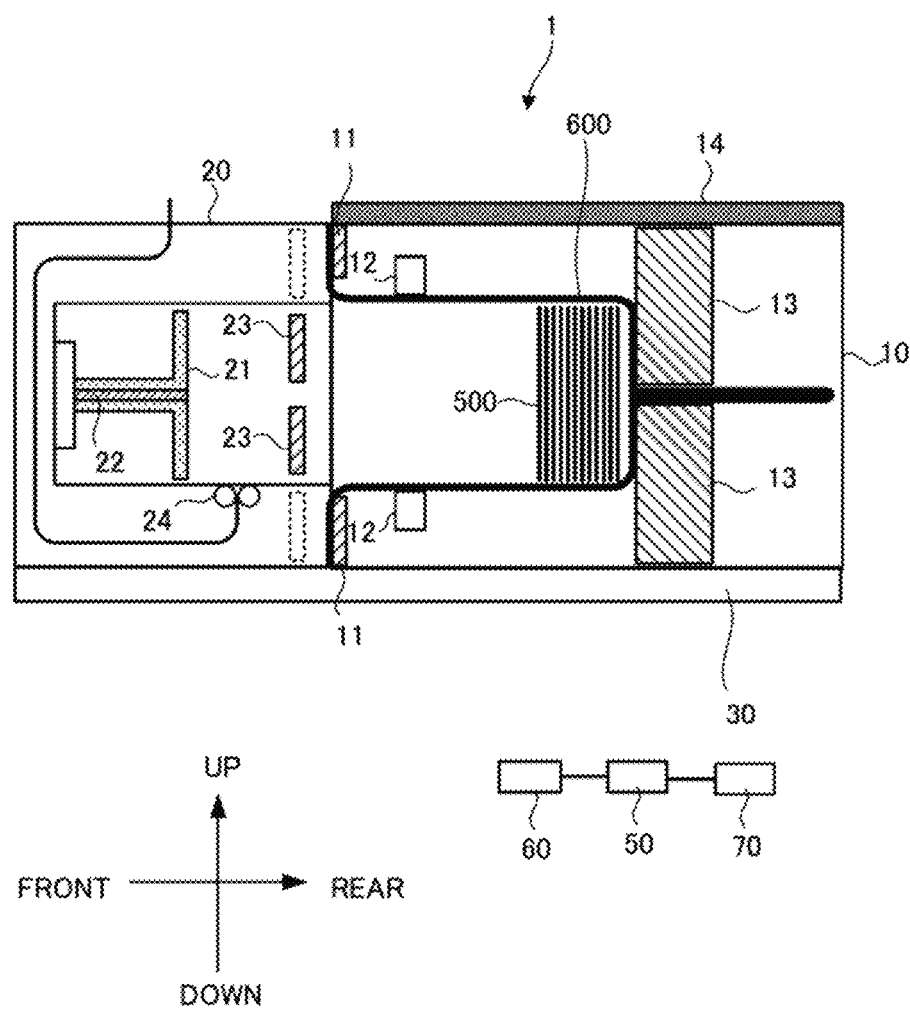
FIG. 20 illustrates the overall configuration of the sheet storage apparatus according to Embodiment 4.

The lower unit 101B comprises the sheet storage apparatus 1. FIG. 20 illustrates the overall configuration of the sheet storage apparatus 1 according to Embodiment 4. In the sheet storage apparatus 1, a storage bag 600, such as a pouch bag, is attached sideways, and the sheets are stacked and stored in a standing position. The standing position of the sheets 500 means that the front surface and the back surface of the sheet 500 face a direction perpendicular to the up-down direction.

In the example illustrated in FIG. 20, the entrance portion of the storage bag 600 is attached to the sheet processing apparatus 100 so as to face the front direction of the sheet processing apparatus 100. However, the present disclosure is not limited thereto. For example, the entrance portion of the storage bag 600 may face the left direction, right direction, rear direction, or another direction perpendicular to the up-down direction of the sheet processing apparatus 100.

As illustrated in FIG. 20, the sheet storage apparatus 1 comprises an attachment unit 10, a moving unit 20, a slide unit 30, the control unit 50, the drive unit 60, and the tension reducing unit 70. Like FIG. 19, FIG. 20 illustrates the sheet storage apparatus 1 disposed so that the entrance portion of the storage bag 600 faces the front direction. That is, the left side in FIG. 20 is the front side of the sheet storage apparatus 1, and the right side in FIG. 20 is the rear side of the sheet storage apparatus 1. In FIG. 20, the direction from the front side to the rear side of the sheet storage apparatus 1 is the same direction as the storage direction described in each of the above-described embodiments.

The attachment unit 10 is a unit to which the storage bag 600 can be attached. The moving unit 20 is a unit that moves the sheets 500 transported by the transport unit 105 in the storage direction while the sheets 500 are in the standing position and stores the sheets 500 inside the storage bag 600.

The attachment unit 10 comprises an attachment portion 11, a sealing unit 12, a stage 13, and a lid portion 14.

The stage 13 is a member that adjusts the depth of the storage bag 600, which is mounted sideways, from the entrance portion to the innermost portion. The stage 13 is provided inside the attachment unit 10 so as to be movable in the storage direction. The stage 13 moves by the driving force supplied from the drive unit 60 under the control of, for example, the control unit 50.

A gap is provided near the center of the stage 13 in the right-left direction or the up-down direction. An innermost part of the storage bag 600 in the storage direction is passed through the gap. In this manner, by moving the stage 13, the amount of sheets 500 that can be stored inside the storage bag 600 can be adjusted, and the remaining portion of the storage bag 600 that is not used for storage can be stored in a portion of the attachment unit 10 closer to the inner side than the gap of the stage 13 in the storage direction. FIG. 20 illustrates an example in which the gap of the stage 13 is provided near the center in the up-down direction.

Since the remaining portion of the storage bag 600 is placed in the gap of the stage 13, the tension reducing unit 70 can easily generate an extra length in the predetermined portion in which the sealing unit 12 seals the storage bag 600, like Embodiments 2 and 3.

The description is made with reference to a particular example. According to Embodiment 2, when the closing unit 71 moves to the first position to close the storage bag 600, the portion of the storage bag 600 located closer to the inner side than the closing unit 71 in the storage direction is pulled toward the outer side along with the movement of the closing unit 71 (refer to FIG. 9). At this time, the remaining portion placed in the gap of the stage 13 is pulled out toward the outer side in the storage direction in accordance with the distance pulled due to the movement of the closing unit 71. Then, when the closing unit 71 moves to the second position, the degree to which the storage bag 600 is pulled by the closing unit 71 is reduced. As a result, the length of the portion pulled out from the stage 13 can be used as an extra length. Thus, the extra length can be generated in the portion of the storage bag 600 that is closer to the outer side in the storage direction than the closing unit 71 (refer to FIG. 10).

Furthermore, according to Embodiment 3, when the pull unit 73 pulls the storage bag 600 toward the outer side in the storage direction (refer to FIG. 18), the remaining portion placed in the gap of the stage 13 is pulled out toward the outer side in the storage direction in accordance with a distance pulled by the pull unit 73. As a result, the length of the portion pulled out from the stage 13 can be used as an extra length. Thus, the extra length can be generated in the portion of the storage bag 600 that is closer to the outer side in the storage direction than the pull unit 73.

Referring back to FIG. 20, an opening is provided on the upper surface of the attachment unit 10. The opening is provided with a lid portion 14 that can be opened and closed. The lid portion 14 is opened and closed, for example, on a hinge by the hand of a user of the sheet processing apparatus 100. When the lower unit 101B comprising the sheet storage apparatus 1 is stored in the sheet processing apparatus 100, the lid portion 14 is closed. As described below, the attachment unit 10 can be pulled out of the housing 101 by using the slide unit 30. After the attachment unit 10 is pulled out of the housing 101, the user can open the lid portion 14 and easily access the inside of the sheet storage apparatus 1 and, in particular, the attachment portion 11. As a result, the user can easily attach the storage bag 600 to the attachment unit 10.

As illustrated in FIG. 20, the moving unit 20 comprises a compression unit 21, a holding unit 22, a regulating unit 23, and a feeding unit 24. The moving unit 20 is disposed adjacent to the attachment unit 10 so as to be closer to the outer side in the storage direction than the attachment unit 10, that is, on the side having the attachment portion 11 disposed thereon. Each of the compression unit 21, the holding unit 22, and the regulating unit 23 moves by the driving force supplied by the drive unit 60 under the control of the control unit 50. One drive unit 60 may supply the driving force to all of the compression unit 21, the holding unit 22, and the regulating unit 23. Alternatively, each of different drive units may supply the driving force to one of the units.

The regulating unit 23 is provided near the boundary between the moving unit 20 and the attachment unit 10 and is a member that regulates the movement of the sheets 500 from the moving unit 20 to the inside of the storage bag 600. When the sheets 500 are not moved into the storage bag 600 by the compression unit 21, the regulating unit 23 regulates the movement of the sheets 500 to prevent the sheets 500 from unintentionally moving into the inside of the storage bag 600. However, the regulating unit 23 eliminates the regulation when the sheets 500 are moved to the storage bag 600 by the compression unit 21.

As illustrated in FIG. 20, the regulating unit 23 has a structure divided into upper and lower parts. The upper part of the regulating unit 23 is configured to be movable upward, and the lower portion of the regulating unit 23 is configured to be movable downward. Thus, the regulating unit 23 can be open and closed. In FIG. 20, the position of the regulating unit 23 that is closed is denoted by solid lines, and the position of the regulating unit 23 that is open is denoted by a broken line.

Figure 21:
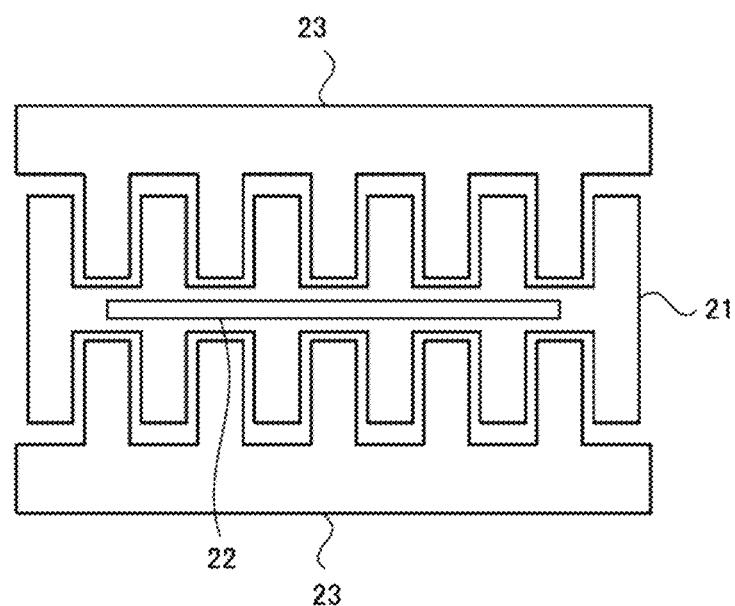
FIG. 21 is a view of a compression unit, a holding unit, and a regulating unit as viewed from the inner side in a storage direction, according to Embodiment 4.

The compression unit 21, the holding unit 22, and the regulating unit 23 are described in detail below. FIG. 21 is a view of the compression unit 21, the holding unit 22, and the regulating unit 23 as viewed from the inner side in the storage direction.

As illustrated in FIG. 21, the end portion of the compression unit 21 on the inner side in the storage direction is formed in a grid pattern. Due to such a shape, the compression unit 21 can efficiently push the sheets 500 that are in a standing position.

As illustrated in FIG. 21, the regulating unit 23 is divided into upper and lower parts, and each of the parts is formed in a comb teeth shape. FIG. 21 illustrates the regulating unit 23 that is closed. Due to the configuration, the regulating unit 23 that is closed can regulate the movement of the sheet 500 to the inner side in the storage direction. In addition, the regulating unit 23 that is open can deregulate the movement of the sheet 500 to the inner side in the storage direction.

Furthermore, as illustrated in FIG. 21, the top end portion of the compression unit 21 on the inner side in the storage direction is formed in a grid pattern that can pass through a comb-shaped gap of the regulating unit 23 that is closed. In this way, the compression unit 21 can efficiently push the sheets 500 that are in a standing position.

The feeding unit 24 feeds the sheet 500 transported by the transport unit 105 into the inside of the moving unit 20. The feeding unit 24 performs a feeding operation under the control of the control unit 50. The feeding unit 24 comprises, for example, a rotating vane that gives momentum to the sheets 500 toward the inner side in the storage direction and feeds the sheet 500 into the inside of the moving unit 20. Thus, the sheets 500 fed by the feeding unit 24 are stacked in a standing position on the outer side in the storage direction of the regulating unit 23 that is closed.

The slide unit 30 is a part for sliding the attachment unit 10 to the outside of the housing 101 of the sheet processing apparatus 100. A door that can be opened and closed is provided on either the front, rear, right, or left wall surface of the lower unit 101B. By using the slide unit 30, the user can pull out the attachment unit 10 to the outside of the housing 101 through the open door. As a result, the user can easily attach and detach the storage bag 600 to and from the attachment unit 10.

The slide unit 30 is, for example, a slide rail member. In the example illustrated in FIG. 19, the slide unit 30 is provided so as to extend in the front-rear direction, and the attachment unit 10 can be pulled out through the door provided on the front side or the rear side of the housing 101. Note that the slide unit 30 may be configured to slide the moving unit 20 along with the attachment unit 10. In this case, a slide unit for sliding the attachment unit 10 and a slide unit for moving the moving unit 20 may be provided separately.

The operation to store the sheets 500 in the storage bag 600 in the sheet storage apparatus 1 is described in detail below with reference to FIGS. 22 to 27. FIGS. 22 to 27 are diagrams illustrating the steps of the operation performed by the sheet storage apparatus 1 to store a predetermined number of sheets in the storage bag 600. In FIGS. 22 to 27, the closing unit 71 and the sealing unit 12 that do not appear in the description are not illustrated.

Figure 22:
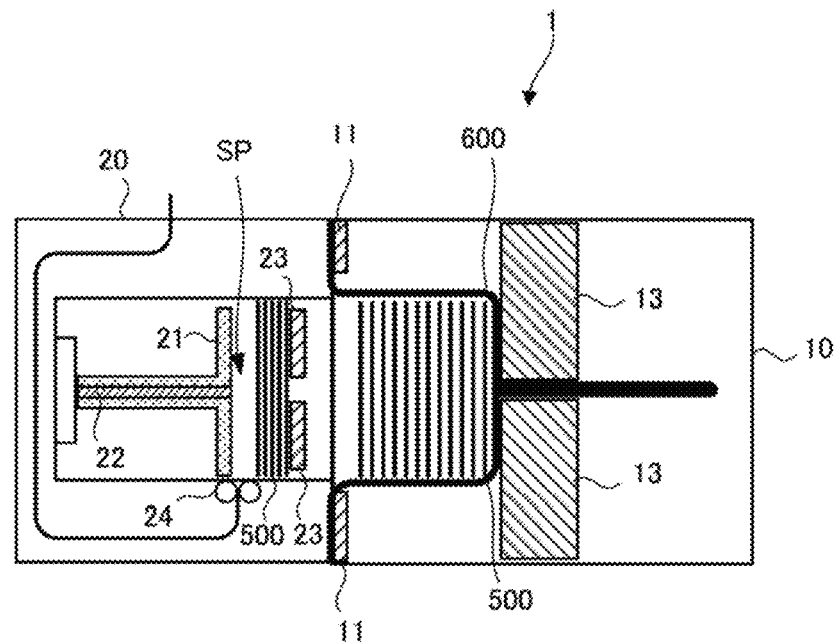
FIG. 22 illustrates the operation performed by the sheet storage apparatus at the time of storage of sheets according to Embodiment 4.

As illustrated in FIG. 22, a predetermined amount of sheets 500 are fed out into a temporary storage portion SP, which is an internal space of the moving unit 20, by the feeding unit 24 and are held so as to lean against the regulating unit 23 (step S1). Note that in the example illustrated in FIG. 22, a certain amount of sheets 500 are stored in the storage bag 600 in advance, and the stage 13 of the attachment unit 10 moves to a position corresponding to the amount of the stored sheets 500.

Figure 23:
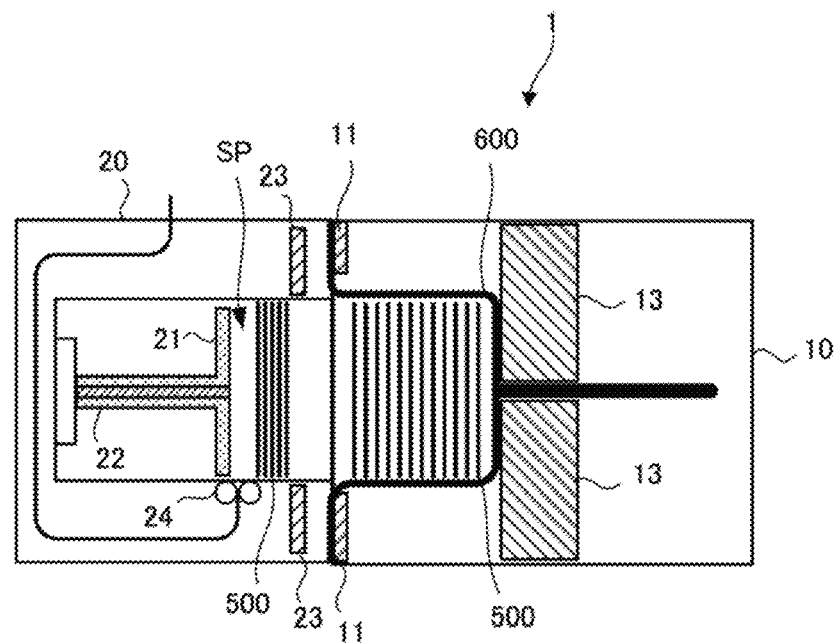
FIG. 23 illustrates the operation performed by the sheet storage apparatus at the time of storage of sheets according to Embodiment 4.

As illustrated in FIG. 23, when the predetermined amount of sheets 500 are reserved, the regulating unit 23 is made open (step S2).

Figure 24:
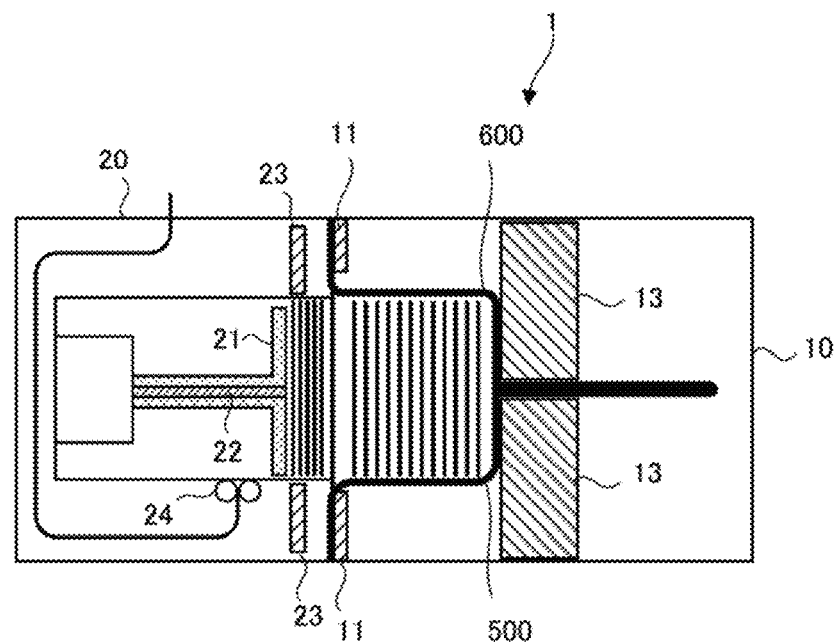
FIG. 24 illustrates the operation performed by the sheet storage apparatus at the time of storage of sheets according to Embodiment 4.

As illustrated in FIG. 24, when the regulating unit 23 is made open, the compression unit 21 pushes the sheets 500 toward the inner side in the storage direction and moves the sheets 500 to the inside of the storage bag 600 (step S3). Note that when the regulating unit 23 is made open, the sheets 500 that have been held so as to lean against the regulating unit 23 are temporarily supported by the sheets 500 that are stored in the storage bag 600 in advance and, thus, do not fall down. If no sheets 500 are present in the storage bag 600 (for example, in the case where the sheets 500 are about to be stored for the first time in the storage bag 600 newly attached to the attachment unit 10), the stage 13 can move to the outermost side in the storage direction so as to prevent fall down of the sheets 500 even when the regulating unit 23 is made open.

Figure 25:
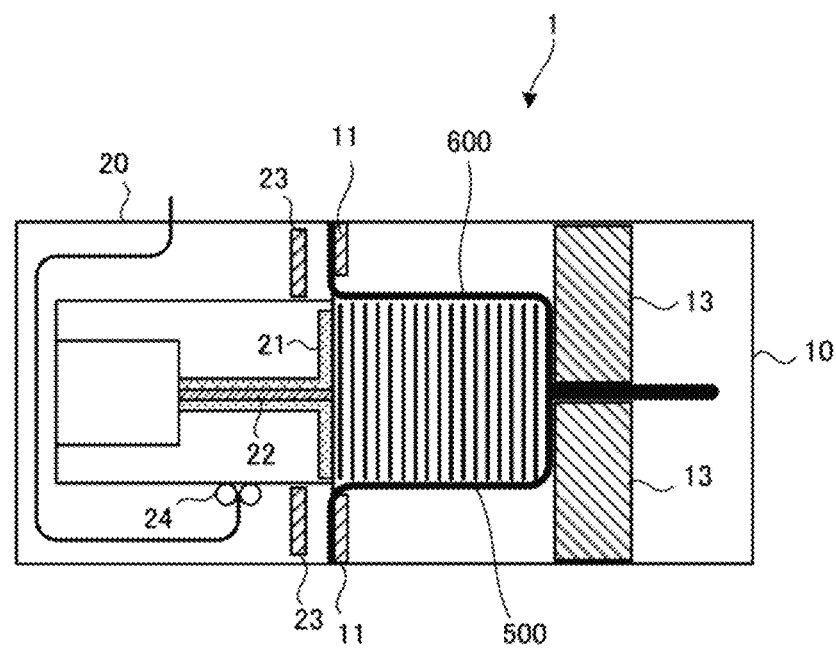
FIG. 25 illustrates the operation performed by the sheet storage apparatus at the time of storage of sheets according to Embodiment 4.

The compression unit 21 continues to move to the inner side in the storage direction and keeps pushing the sheets 500 stored in the storage bag 600. The movement of the compression unit 21 toward the inner side in the storage direction continues until the top end of the compression unit 21 reaches a predetermined storage position. FIG. 25 illustrates the top end of the compression unit 21 that has reached the storage position. If the top end of the compression unit 21 cannot reach the storage position due to the thickness of the sheets 500 stored inside the storage bag 600, the stage 13 moves to the inner side in the storage direction, as illustrated in FIG. 25, so that the top end of the compression unit 21 reaches the storage position (step S4).

Even after the position of the top end of the compression unit 21 in the storage direction reaches the predetermined storage position, the driving force to move the compression unit 21 to the inner side in the storage direction is continuously supplied. As a result, the sheets 500 are compressed by the compression unit 21 inside the storage bag 600. As used herein, the term "predetermined storage position" refers to, for example, a position slightly close to the inner side in the storage direction than the regulating unit 23.

Figure 26:
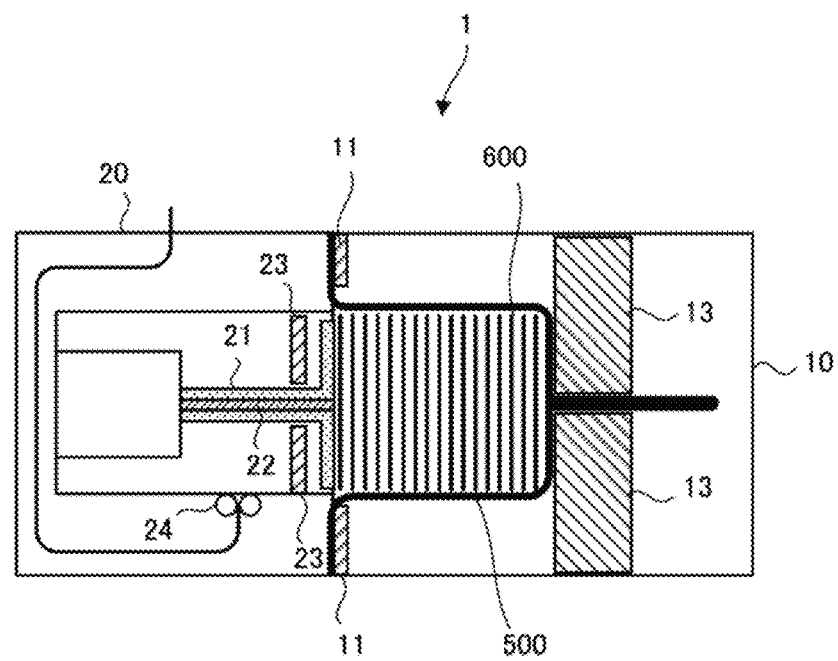
FIG. 26 illustrates the operation performed by the sheet storage apparatus at the time of storage of sheets according to Embodiment 4.

After the position of the top end of the compression unit 21 in the storage direction reaches the predetermined storage position, the supply of the driving force to the compression unit 21 is stopped, and the position of the compression unit 21 in the storage direction is fixed. Then, as illustrated in FIG. 26, the regulating unit 23 is closed (step S5).

Figure 27:
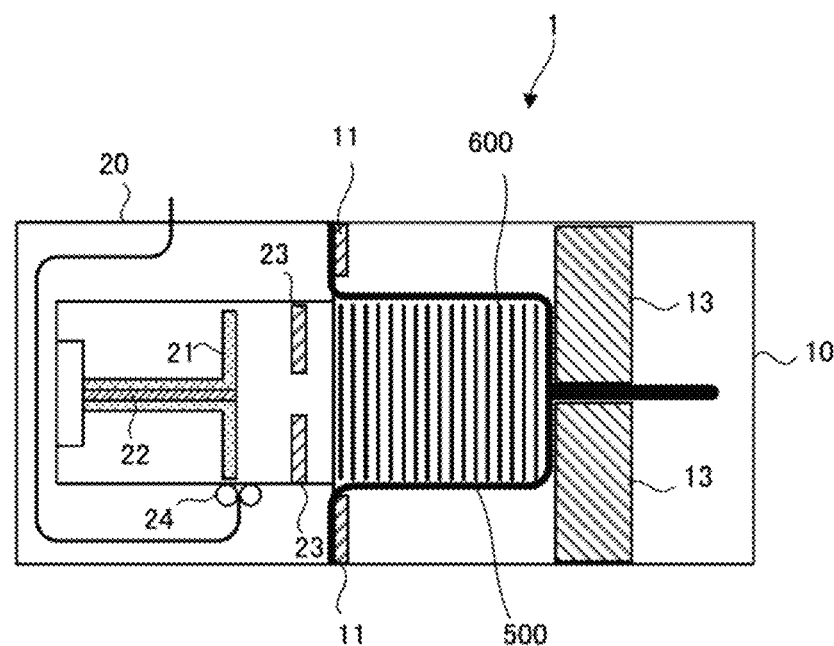
FIG. 27 illustrates the operation performed by the sheet storage apparatus at the time of storage of sheets according to Embodiment 4.

As illustrated in FIG. 27, when the regulating unit 23 is closed, the entire compression unit 21 returns to the outer side in the storage direction through the gap (refer to FIG. 21) of the regulating unit 23 (step S6). As a result, inside the storage bag 600, the sheets 500 that have lost the compressive force of the compression unit 21 attempt to return to the outer side in the storage direction. However, the sheets 500 cannot return to the inside of the moving unit 20 due to the regulating unit 23. In this way, the storage of the sheets 500 in the storage bag 600 is completed.

After the storage of the sheets 500 in the storage bag 600 is completed as described above, the operation to seal the storage bag 600 is performed by the sealing unit 12, as described in Embodiment 2 or Embodiment 3. In addition, as described in Embodiment 2 or Embodiment 3, even in Embodiment 4, the tension reducing unit 70 reduces the tension applied to the predetermined portion of the storage bag 600 to be sealed by the sealing unit 12 during the sealing operation.

The invention claimed is:

1. A sheet storage apparatus, comprising:
   a sealing unit that seals a predetermined portion of a storage bag, the storage bag storing sheets in a storage direction; and
   a tension reducing unit that reduces tension applied to the predetermined portion, the tension reducing unit including a first closing unit and a second closing unit that are disposed with the storage bag therebetween in a first direction perpendicular to the storage direction to sandwich the storage bag from an outside thereof, wherein
   the first closing unit and the second closing unit move while facing each other to close the storage bag at a position that is closer, in the storage direction, to a storage area of the storage bag than to the predetermined portion,
   the first closing unit and the second closing unit move to a first position, and then move to a second position from the first position before the sealing unit starts to seal the storage bag, and
   a distance between the first closing unit and the second closing unit at the second position is greater than a distance between the first closing unit and the second closing unit at the first position.

2. The sheet storage apparatus according to claim 1, wherein the sealing unit moves to a sealing position at which the storage bag is sealed, along with an operation performed by the first closing unit and the second closing unit to close the storage bag.

3. The sheet storage apparatus according to claim 1, wherein
   the first closing unit and the second closing unit are members that extend parallel to each other in a second direction which is perpendicular to the storage direction and to the first direction, and
   a length of the first closing unit and the second closing unit is less than a length of the storage bag in the second direction.

4. The sheet storage apparatus according to claim 1, wherein the storage bag is attached so that the storage direction of the sheets is horizontal, and the sheets are pushed into the storage bag in a standing position.

5. The sheet storage apparatus according to claim 1, further comprising:
an attachment portion to which the storage bag is to be attached.

6. The sheet storage apparatus according to claim 1, wherein the sealing unit applies heat to the predetermined portion.

7. The sheet storage apparatus according to claim 6, wherein the tension reducing unit adjusts a distance between the first closing unit and the second closing unit at the second position in accordance with an amount of the sheets stored in the storage bag.

8. The sheet storage apparatus according to claim 1, wherein the sealing unit welds the storage bag.

9. The sheet storage apparatus according to claim 1, wherein the sealing unit pressure bonds the storage bag.

10. The sheet storage apparatus according to claim 1, wherein the sealing unit includes a stapler and staples the storage bag.

11. The sheet storage apparatus according to claim 1, wherein the first closing unit and the second closing unit move to the second position from the first position after the sealing unit moves to a sealing position and before the sealing unit seals the storage bag.

12. A sheet processing apparatus comprising:
a receiving unit that receives sheets; and
the sheet storage apparatus according to claim 1 that stores the sheets that have been received.

13. A sheet storage method, comprising:
reducing tension applied to a predetermined portion of a storage bag, which stores sheets in a storage direction, by moving a first closing unit and a second closing unit to a first position, and then moving to a second position; and
sealing the predetermined portion of the storage bag, wherein
the first closing unit and the second closing unit are disposed with the storage bag therebetween in a first direction perpendicular to the storage direction to sandwich the storage bag from an outside thereof,
the first closing unit and the second closing unit face each other and are moved to close the storage bag at a position that is closer, in the storage direction, to a storage area of the storage bag than to the predetermined portion,
the first closing unit and the second closing unit are moved to the second position from the first position before the sealing starts to seal the storage bag, and
a distance between the first closing unit and the second closing unit at the second position is greater than a distance between the first closing unit and the second closing unit at the first position.

* * * * *